United States Patent
Hsu et al.

(10) Patent No.: US 10,444,411 B2
(45) Date of Patent: Oct. 15, 2019

(54) OPTICAL LENS ASSEMBLY, IMAGING LENS MODULE AND ELECTRONIC APPARATUS

(71) Applicant: LARGAN PRECISION CO., LTD., Taichung (TW)

(72) Inventors: Chih-Wen Hsu, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/369,572

(22) Filed: Mar. 29, 2019

(65) Prior Publication Data

US 2019/0227203 A1    Jul. 25, 2019

Related U.S. Application Data

(63) Continuation of application No. 16/036,997, filed on Jul. 17, 2018, now Pat. No. 10,288,778, which is a continuation of application No. 15/592,558, filed on May 11, 2017, now Pat. No. 10,054,721.

(30) Foreign Application Priority Data

Jan. 12, 2017   (TW) .............................. 106101054 A
Jan. 12, 2017   (TW) .............................. 106200576 U

(51) Int. Cl.
  *G02B 9/00*      (2006.01)
  *G02B 5/00*      (2006.01)
  *G02B 7/02*      (2006.01)
  *G02B 13/00*     (2006.01)

(52) U.S. Cl.
  CPC ............. *G02B 5/005* (2013.01); *G02B 7/021* (2013.01); *G02B 7/022* (2013.01); *G02B 7/026* (2013.01); *G02B 13/001* (2013.01)

(58) Field of Classification Search
  CPC ....................................................... G02B 7/025
  USPC ......................................................... 359/740
  See application file for complete search history.

(56) References Cited

U.S. PATENT DOCUMENTS

| | | | |
|---|---|---|---|
| 9,304,233 B2 | 4/2016 | Kim | |
| 9,400,383 B2 | 7/2016 | Liang | |
| 2002/0089176 A1 | 7/2002 | Iwasaki | |
| 2011/0063739 A1* | 3/2011 | Hirata | G02B 7/021 |
| | | | 359/819 |

FOREIGN PATENT DOCUMENTS

TW          M490029 U      11/2014

* cited by examiner

*Primary Examiner* — James C. Jones
(74) *Attorney, Agent, or Firm* — McClure, Qualey & Rodack, LLP

(57) ABSTRACT

An optical lens assembly includes at least two lens elements and at least one light blocking sheet. Each of the lens elements includes a connecting structure for aligning the two lens elements. Each of the connecting structures includes a connecting surface and a circular conical surface, and a receiving space is formed between the two lens elements. A vertical distance between the receiving space and an optical axis is shorter than a vertical distance between each circular conical surface and the optical axis. The light blocking sheet is received in the receiving space and has a polygonal opening, and an outside diameter of the light blocking sheet is smaller than or equal to a minimum diameter of each circular conical surface.

16 Claims, 22 Drawing Sheets

1300

1301

1300

θ

φi

OPTICAL LENS ASSEMBLY, IMAGING LENS MODULE AND ELECTRONIC APPARATUS

RELATED APPLICATIONS

The present application is a continuation of U.S. application Ser. No. 16/036,997, filed Jul. 17, 2018, which is a continuation of U.S. application Ser. No. 15/592,558, filed May 11, 2017, now U.S. Pat. No. 10,054,721 B2 issued on Aug. 21, 2018, which claims priority to Taiwan Application Serial Numbers 106101054 and 106200576, both filed Jan. 12, 2017, which are herein incorporated by reference.

BACKGROUND

Technical Field

The present disclosure relates to an optical lens assembly and an imaging lens module. More particularly, the present disclosure relates to an optical lens assembly and an imaging lens module for a portable electronic device.

Description of Related Art

With the popularity of personal electronic products and mobile communication products having camera functionalities, such as smart phones and tablet personal computers, compact imaging lens modules are in popular. The demand for compact imaging lens modules with high resolution and high image quality has also been increasing significantly.

A light blocking sheet is used to block unnecessary lights in the imaging lens module. However, a fake lens flare is still existed due to the limited light blocking effect of the current light blocking sheet under a high-intense light source.

In general, the light blocking sheet within the imaging lens module is disposed between two adjacent lens elements. However, both the connecting structure between the two adjacent lens elements and the engaging structure between each of the lens elements and the light blocking sheet are unstable so that the lens elements and the light blocking sheet are always deformed when an external force is applied.

SUMMARY

According to one aspect of the present disclosure, an optical lens assembly includes at least two lens elements and at least one light blocking sheet. Each of the lens elements includes a connecting structure for aligning the two lens elements. Each of the connecting structures includes a connecting surface and a circular conical surface. The connecting surfaces of the two lens elements are connected to each other, the circular conical surfaces of the two lens elements are connected to each other for forming a receiving space between the two lens elements, and a vertical distance between the receiving space and an optical axis is shorter than a vertical distance between each of the circular conical surfaces and the optical axis. The light blocking sheet is received in the receiving space and has a polygonal opening. An outside diameter of the light blocking sheet is smaller than an outside diameter of each lens element, and the outside diameter of the light blocking sheet is smaller than or equal to a minimum diameter of the circular conical surface of each lens element. The polygonal opening has a plurality of inner sides, an external angle formed between every two inner sides adjacent to each other, which is less than 90 degrees, is θ, and the following condition is satisfied: 9.0 degrees<θ<33.0 degrees.

According to another aspect of the present disclosure, an imaging lens module include a barrel and the optical lens assembly as mentioned above, in which the optical lens assembly is disposed in the barrel. The polygonal opening of the light blocking sheet of the optical lens assembly is corresponding to a minimum central opening of the barrel, and the minimum central opening is an aperture stop of the imaging lens module.

According to another aspect of the present disclosure, an electronic apparatus includes the abovementioned imaging lens module and an image sensor. The image sensor is disposed on an image surface of the imaging lens module.

According to another aspect of the present disclosure, an imaging lens module includes a barrel and an optical lens assembly, in which the optical lens assembly is disposed in the barrel. The optical lens assembly includes a plurality of lens elements and at least one light blocking sheet. The light blocking sheet has a polygonal opening, and the polygonal opening is corresponding to a minimum central opening of the barrel. The polygonal opening has a plurality of inner sides, an inner diameter of the polygonal opening of the light blocking sheet is φi, a length of each inner side is s, a quantity of the lens elements is N, and the following conditions are satisfied: $7.1 < \varphi i/(s/2) < 30$; and $5 \leq N \leq 9$.

According to another aspect of the present disclosure, an electronic apparatus includes the abovementioned imaging lens module and an image sensor. The image sensor is disposed on an image surface of the imaging lens module.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
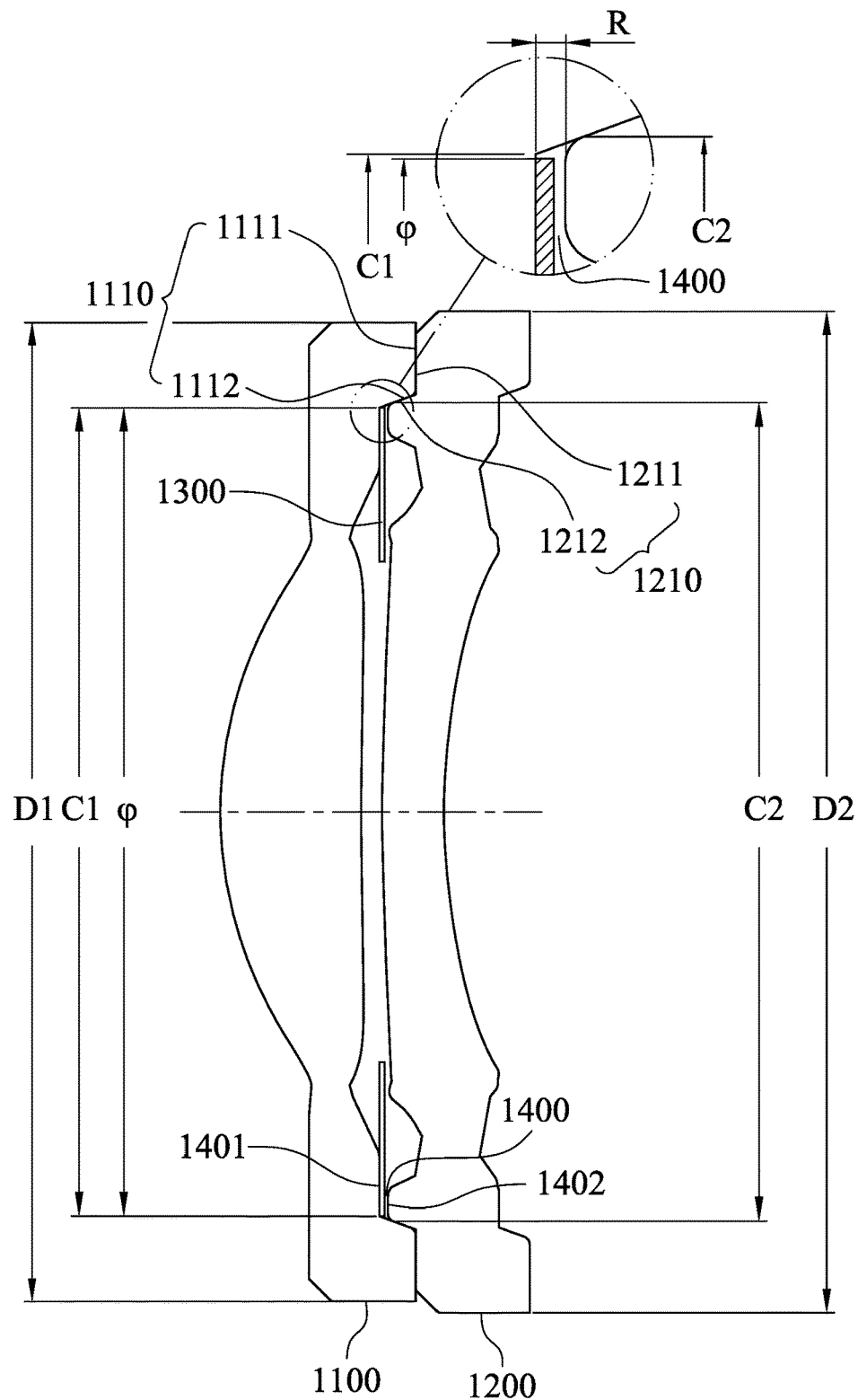
FIG. 1A is a schematic view of an optical lens assembly according to an embodiment of the present disclosure.
Figure 1B:
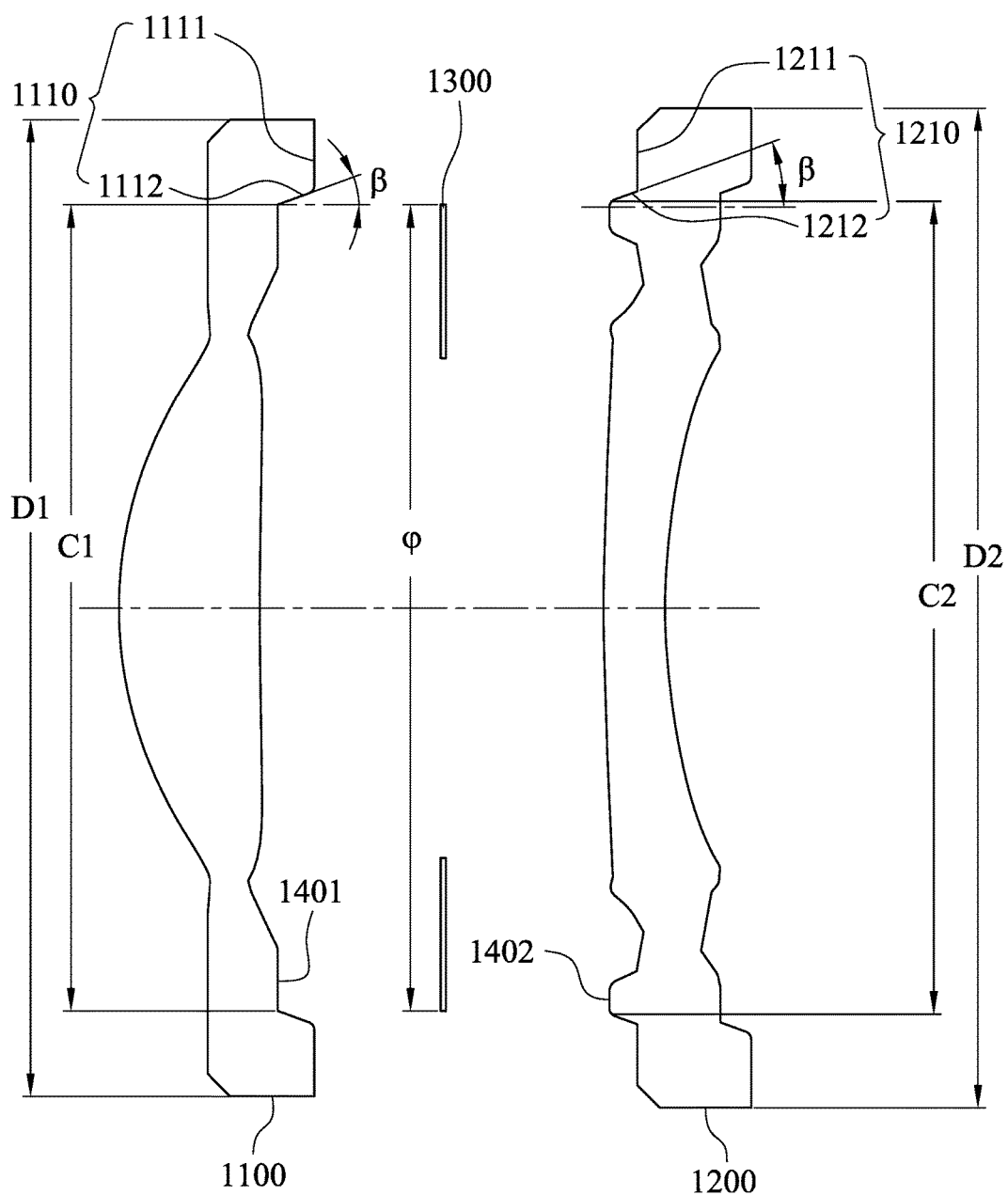
FIG. 1B is an exploded view of the optical lens assembly in FIG. 1A.
Figure 1C:
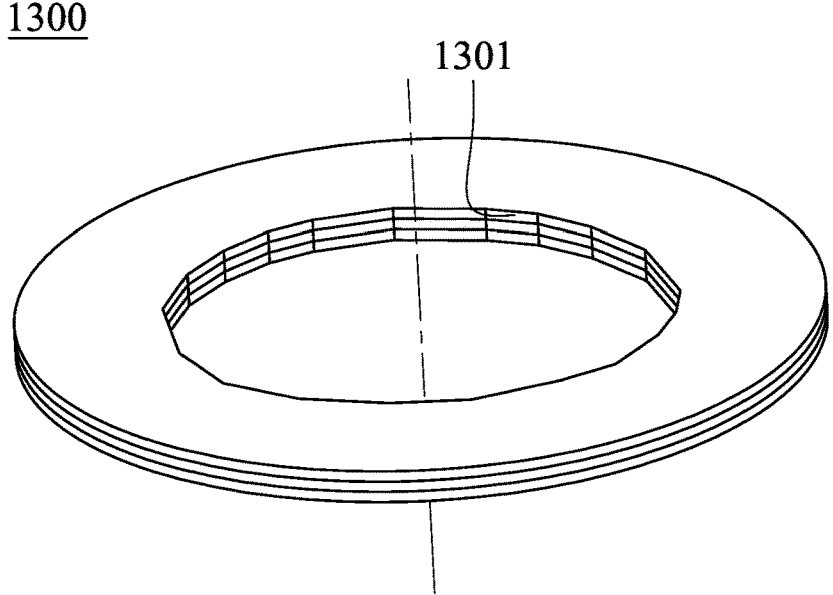
FIG. 1C is a three dimensional view of a light blocking sheet of the optical lens assembly in FIG. 1A.

Please refer to FIG. 1A, FIG. 1B and FIG. 1C. FIG. 1A is a schematic view of an optical lens assembly according to an embodiment of the present disclosure, FIG. 1B is an exploded view of the optical lens assembly in FIG. 1A, and FIG. 1C is a three dimensional view of a light blocking sheet 1300 of the optical lens assembly in FIG. 1A. In FIG. 1A and FIG. 1B, the optical lens assembly includes at least two lens elements and at least one light blocking sheet 1300. As shown in FIG. 1A, the optical lens assembly includes two lens elements 1100, 1200. The lens element 1100 and the lens element 1200 include a connecting structure 1110 and a connecting structure 1210, respectively, for aligning an optical axis of the lens element 1100 and an optical axis of the lens element 1200. The connecting structures 1110, 1210 include, respectively, connecting surfaces 1111, 1211 and circular conical surfaces 1112, 1212. The connecting surfaces 1111, 1211 of the two lens elements 1100, 1200 are correspondingly connected to each other, the circular conical surfaces 1112, 1212 of the two lens elements 1100, 1200 are correspondingly connected to each other for forming a receiving space 1400 between the two lens elements 1100, 1200. A vertical distance between the receiving space 1400 and an optical axis is shorter than a vertical distance between each of the circular conical surfaces 1112, 1212 and the optical axis. The light blocking sheet 1300 is received in the receiving space 1400, in which an outside diameter φ of the light blocking sheet 1300 is smaller than an outside diameter D1 of the lens element 1100 and an outside diameter D2 of the lens element 1200. The outside diameter φ of the light blocking sheet 1300 is smaller than or equal to a minimum diameter C1 of the circular conical surface 1112 of the lens element 1100 and a minimum diameter C2 of the circular conical surface 1212 of the lens element 1200. When a width parallel to the optical axis of the receiving space 1400 is R, R is ranged from 0.01 mm to 0.05 mm.

Figure 1D:
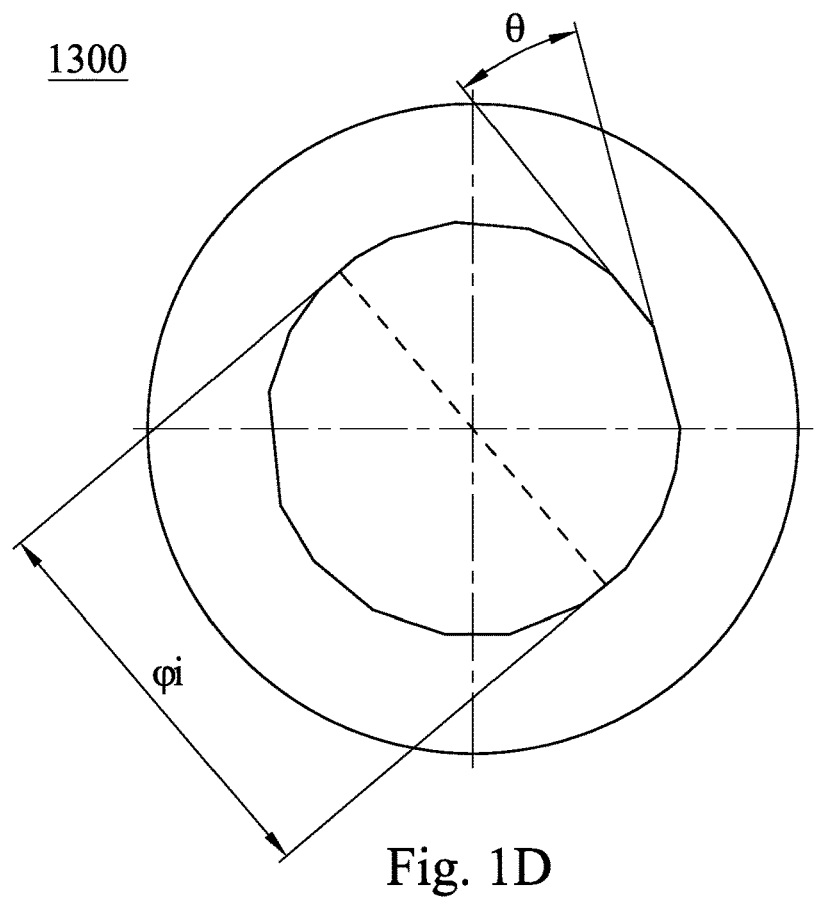
FIG. 1D is a plan view of the light blocking sheet in FIG. 1C.

FIG. 1D is a plan view of the light blocking sheet 1300 in FIG. 1C. As shown in FIG. 1D, the light blocking sheet 1300 has a polygonal opening 1301, and the polygonal opening 1301 has a plurality of inner sides. When an external angle formed between every two inner sides adjacent to each other, which is less than 90 degrees, is θ, the following condition is satisfied: 9.0 degrees<θ<33.0 degrees. Therefore, a specific light ray can be blocked precisely so that the image viewed by naked eyes can be truly presented. Accordingly, a better image quality can be achieved under a high-intense light source.

Figure 1E:
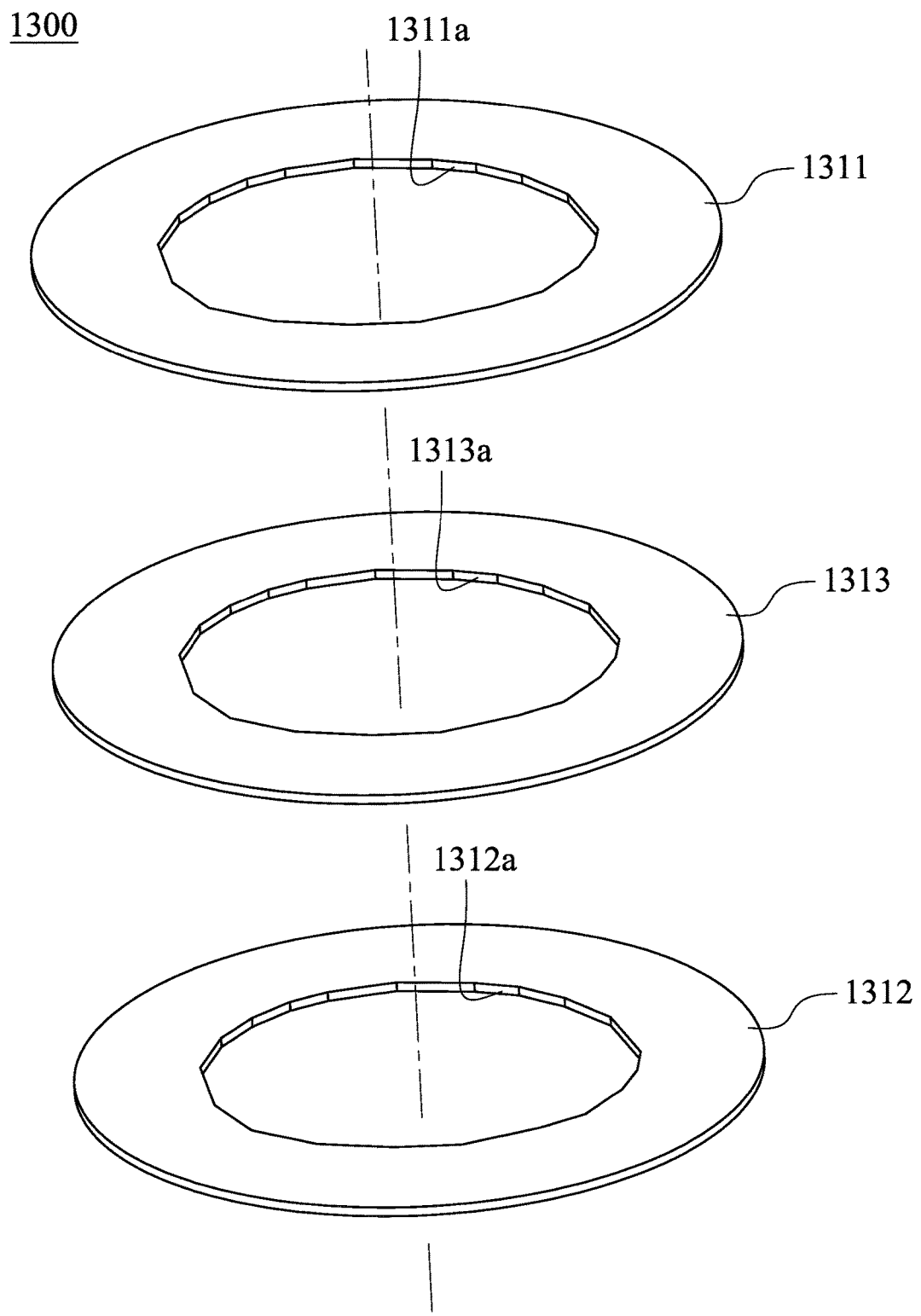
FIG. 1E is an exploded view of the light blocking sheet in FIG. 1C.
Figure 1F:
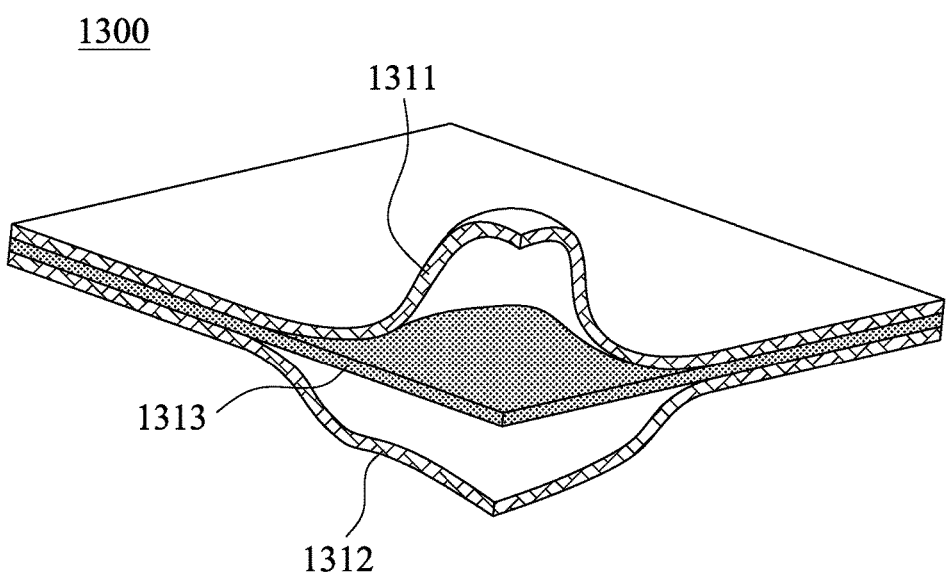
FIG. 1F is a partially separation schematic view of the light blocking sheet in FIG. 1C.

Please refer to FIG. 1E and FIG. 1F. FIG. 1E is an exploded view of the light blocking sheet 1300 in FIG. 1C, and FIG. 1F is a partially separation schematic view of the light blocking sheet 1300 in FIG. 1C. As shown in FIG. 1E, the light blocking sheet 1300 is a composite light blocking sheet and includes a first surface layer 1311, a second surface layer 1312 and an inside substrate layer 1313. The first surface layer 1311 has a first opening 1311a, the second surface layer 1312 has a second opening 1312a, and the inside substrate layer 1313 has a substrate opening 1313a. The inside substrate layer 1313 is disposed between the first surface layer 1311 and the second surface layer 1312 to connect the first surface layer 1311 and the second surface layer 1312. The first opening 1311a, the second opening 1312a and the substrate opening 1313a are correspondingly disposed along the optical axis to form the polygonal opening 1301. Because the strength of the material can be controlled easily by utilizing the composite material, a polygonal opening with high quality can be manufactured to reduce the thickness of the light blocking sheet. Moreover, a thinner light blocking sheet is favorable to be received in the receiving space and will not affect the accuracy of assembling the lens elements. In FIG. 1F, the first surface layer 1311 and the second surface layer 1312 are torn by an external force and are distorted due to a non-uniform extension. However, under normal circumstance, the first surface layer 1311 is tightly connected with the second surface layer 1312 via the inside substrate layer 1313.

Furthermore, the inside substrate layer 1313 of the light blocking sheet 1300 is made of a plastic material. In details, the plastic material of the inside substrate layer 1313 can be but not limited to black or transparent polycarbonate (PC), polyethylene terephthalate (PET) or polymethylmethacrylate (PMMA). The first surface layer 1311 and the second surface layer 1312 of the light blocking sheet 1300 are made of black carbon-containing materials. Thus, it is favorable to prevent the light blocking sheet 1300 from warping and to obtain a flat light blocking sheet after a stamping process.

In FIG. 1B, when an angle between each of the circular conical surfaces 1112, 1212 of the lens elements 1100, 1200 and the optical axis is β, the following condition is satisfied: 0 degrees<β<40 degrees. The corresponding circular conical surfaces 1112, 1212 allow the adjacent lens elements 1100, 1200 to be aligned to each other so that the angles between the circular conical surfaces 1112, 1212 and the optical axis are the same. When the abovementioned conditions are satisfied, it maintains the accurate alignment with the optical axis and reduces the failure of the assembling process.

In FIG. 1B, the lens elements 1100, 1200 can further include flat surfaces 1401, 1402, respectively. The flat surfaces 1401, 1402 are corresponding to the receiving space 1400 and vertical to the optical axis. Accordingly, an appropriate space is provided for receiving the light blocking sheet 1300. Thus, the light blocking sheet 1300 will not be affected by the unnecessary external force in the receiving space, and the deformation of the light blocking sheet 1300 can be further prevented.

In the optical lens assembly, at least one of the two lens elements is aligned to the light blocking sheet via the circular conical surface thereof. In details, each of the circular conical surfaces 1112, 1212 of the lens elements 1100, 1200 is not only utilized to align the lens elements with each other but also is favorable to align the optical axis thereof to a central axis of the light blocking sheet 1300 as shown in FIG. 1A. Therefore, the assembling process of the lens elements becomes smoothly, and the entire structure will be simplified.

Referring back to FIG. 1D, when an inner diameter of the polygonal opening 1301 of the light blocking sheet 1300 is φi (that is, a connecting line through the optical axis between any two of the inner sides of the polygonal opening 1301 of the light blocking sheet 1300), and the outside diameter of the light blocking sheet 1300 is φ, the following condition is satisfied: $0.47<\varphi i/\varphi<0.90$. Accordingly, the optical lens assembly is favorable to be applied in an imaging lens module with a large aperture. In particular, the term "large aperture" means the imaging lens module has an f-number less than 2.4. However, the present disclosure is not limited thereto. More particularly, the inner diameter of the polygonal opening 1301 and the outside diameter of the light blocking sheet 1300 satisfy the following condition: $0.55<\varphi i/\varphi<0.90$. Thus, a light blocking sheet, which is applied for providing an accurate light blocking range, can be placed in a compact receiving space.

Figure 2A:
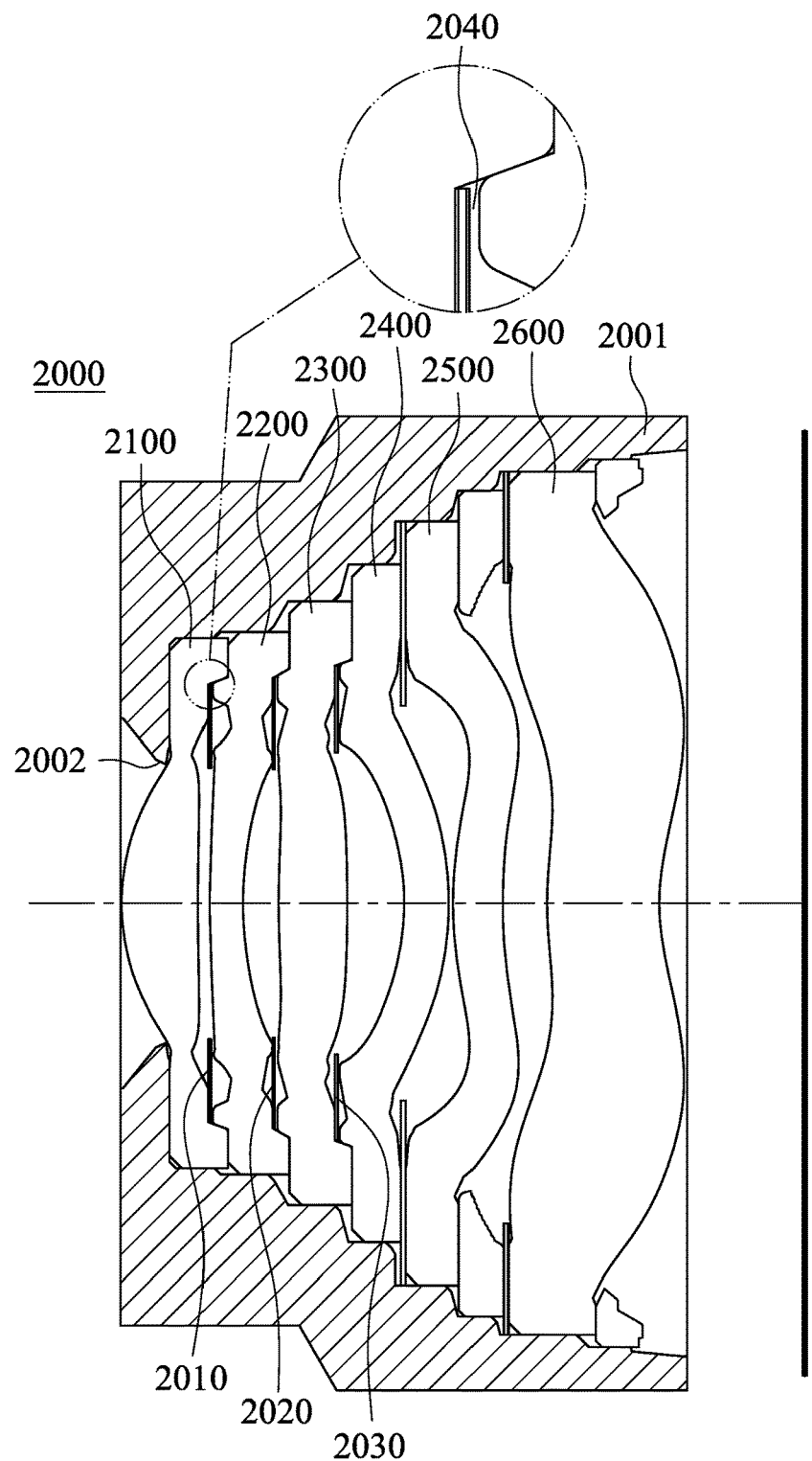
FIG. 2A is a schematic view of an imaging lens module according to another embodiment of the present disclosure.
Figure 2B:
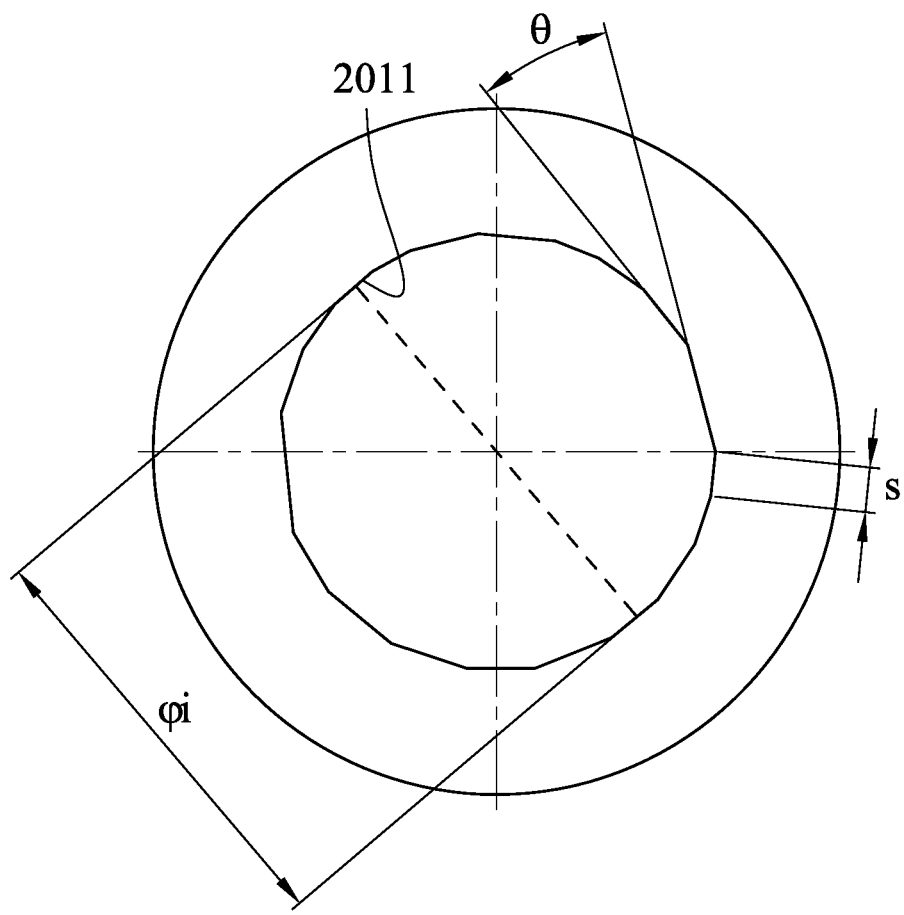
FIG. 2B is a schematic view of a light blocking sheet in FIG. 2A.

Please refer to FIG. 2A and FIG. 2B. FIG. 2A is a schematic view of an imaging lens module 2000 according to another embodiment of the present disclosure, and FIG. 2B is a schematic view of a light blocking sheet 2010 in FIG. 2A. In FIG. 2A, the imaging lens module 2000 includes a barrel 2001 and an optical lens assembly, and the optical lens assembly mentioned herein can be but not limited to the optical lens assembly in FIG. 1A. In details, the optical lens assembly includes several lens elements (2100, 2200, 2300, 2400, 2500, 2600) and at least one light blocking sheet (2010, 2020, 2030). The light blocking sheet 2010 is received in a receiving space 2040 between the lens element 2100 and the lens element 2200, the light blocking sheet 2020 is received in a receiving space (the reference numerals are omitted) between the lens element 2200 and the lens element 2300, and the light blocking sheet 2030 is received in a receiving space (the reference numerals are omitted) between the lens element 2300 and the lens element 2400.

As shown in FIG. 2A and FIG. 2B, the light blocking sheet 2010 has a polygonal opening 2011, and the polygonal opening 2011 has a plurality of inner sides. When an inner diameter of the polygonal opening 2010 of the light blocking sheet 2010 is φi, a length of each inner side is s, and a quantity of the lens elements is N, the following conditions are satisfied: $7.1<\varphi i/(s/2)<30$; and $5\leq N\leq 9$. Therefore, a specific light ray can be blocked precisely when the light blocking sheet satisfied the abovementioned conditions is configured so that the image viewed by naked eyes can be truly presented. Accordingly, a better image quality can be achieved under a high-intense light source.

In FIG. 2A, a minimum central opening 2002 of the barrel 2001 can be an aperture stop of the imaging lens module 2000. The polygonal opening 2011 of the light blocking sheet 2010 of the optical lens assembly is corresponding to the minimum central opening 2002 of the barrel 2001, that is, the polygonal opening 2011 and the minimum central opening 2002 are arranged coaxially. Accordingly, the optical structure can be simplified, and it is favorable to satisfy the demand for compact imaging lens modules.

In this embodiment, the lens element, the light blocking sheet and the configuration therebetween can satisfy the conditions of FIGS. 1A-1F. Thus, it will not to be repeated herein. In addition, the receiving spaces between the lens elements can not only receive the light blocking sheet but also receive other optical components, such as lens elements or mirror rings.

Figure 3:
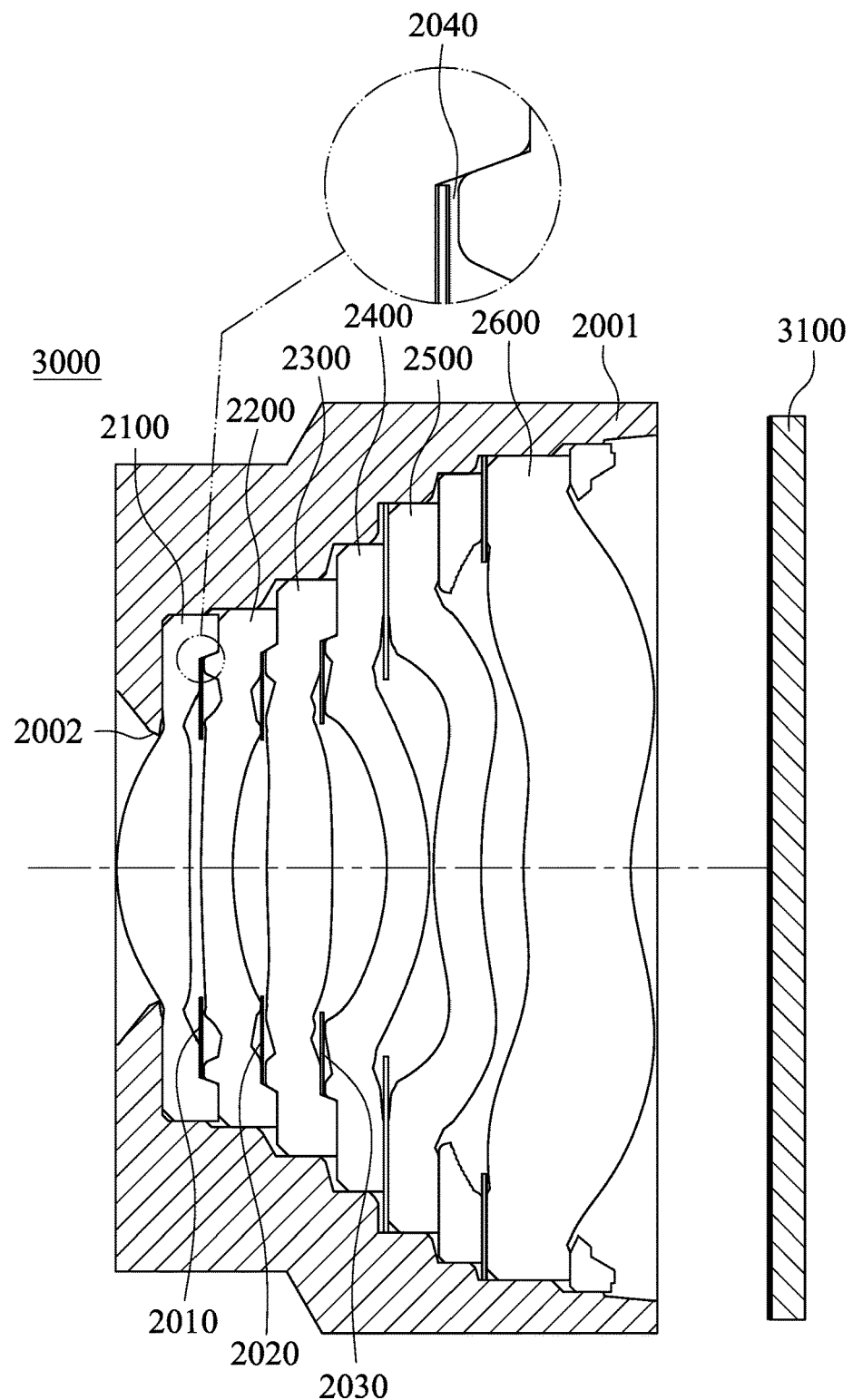
FIG. 3 is a schematic view of an electronic apparatus according to yet another embodiment of the present disclosure.

FIG. 3 is a schematic view of an electronic apparatus 3000 according to yet another embodiment of the present disclosure. In FIG. 3, the electronic apparatus 3000 includes an imaging lens module and an image sensor 3100. In particular, the imaging lens module is but not limited to the imaging lens module 2000 in FIG. 2A. Therefore, a specific light ray can be blocked precisely so that the image viewed by naked eyes can be truly presented. Accordingly, a better image quality can be achieved under a high-intense light source. The electronic apparatus 3000 can further include but is not limited to a display, a control unit, a storage unit, a random access memory unit (RAM) or a read-only memory unit (ROM) or a combination thereof. Moreover, the electronic apparatus 3000 can be applied to but is not limited to a 3D (three-dimensional) image capturing applications, in products such as digital cameras, mobile devices, digital tablets, smart TV, surveillance devices, game consoles with motion sensing function, vehicle cameras such as driving recording systems and rear view camera systems, aerial photography devices, sports photography equipment, all kinds of smart electronics and wearable devices.

According to the aforementioned embodiments, a plurality of examples are provided in cooperated with figures for details.

1st Example

Figure 4A:
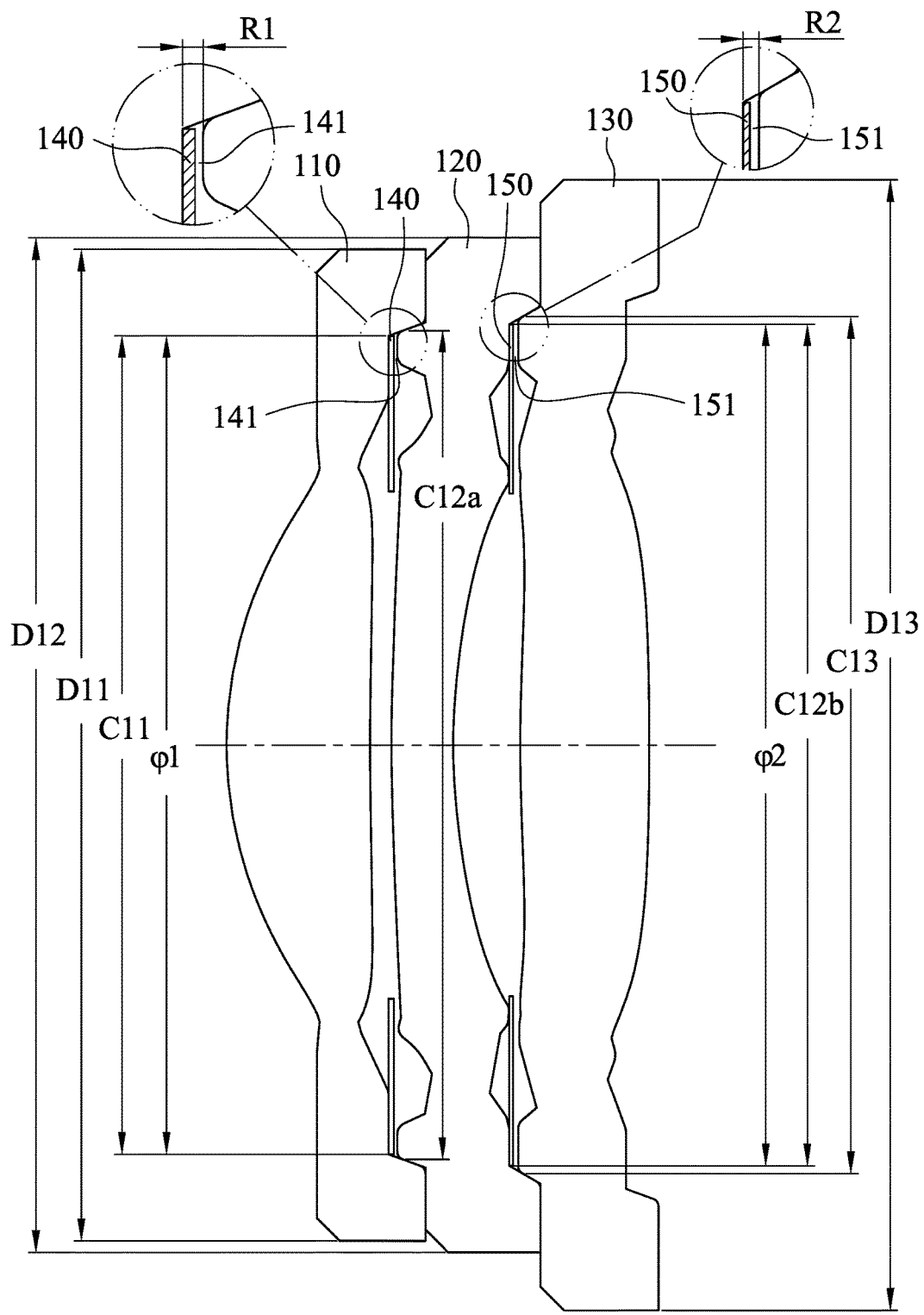
FIG. 4A is a schematic view of an optical lens assembly according to a 1st example of the present disclosure.
Figure 4B:
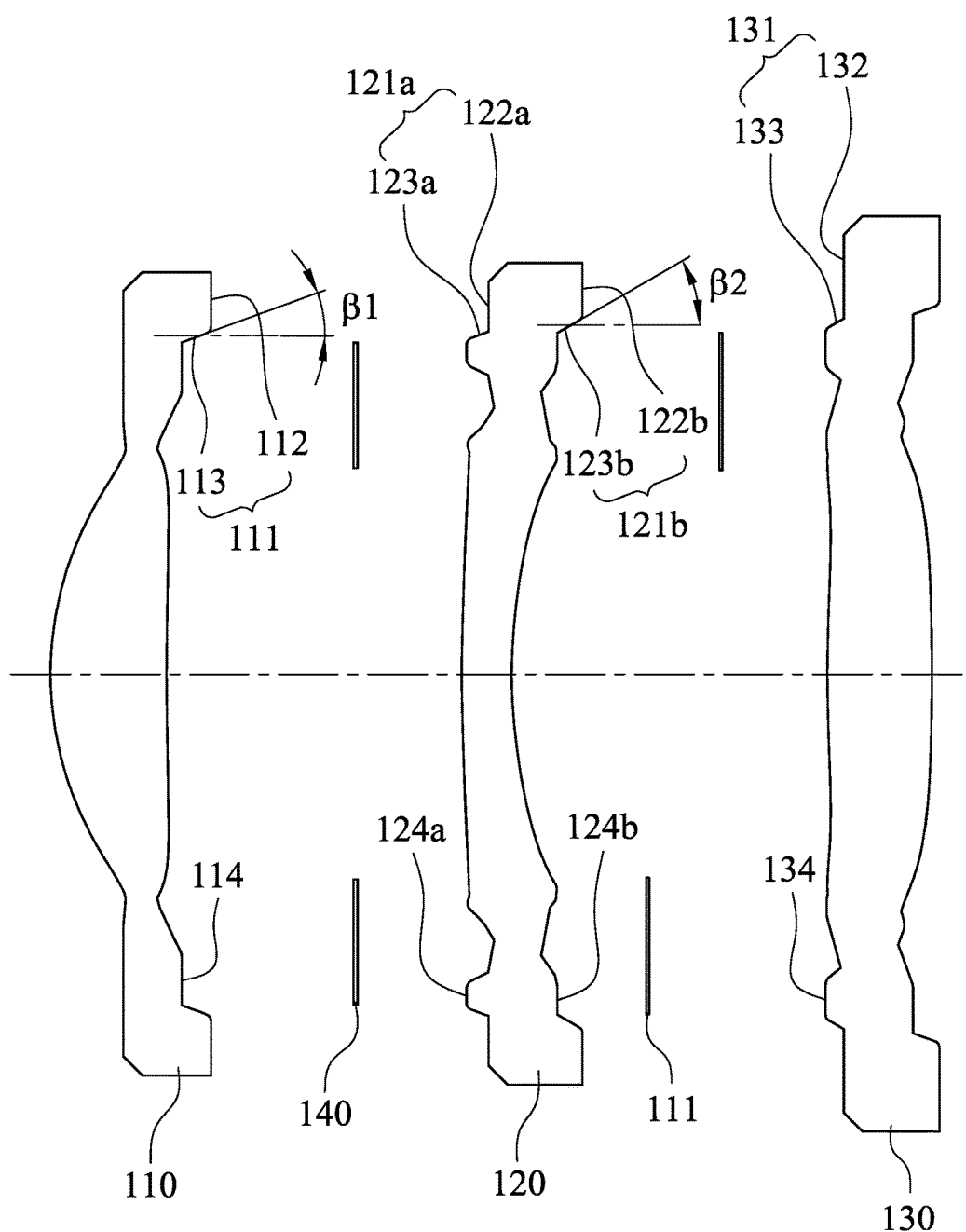
FIG. 4B is an exploded view of the optical lens assembly according to the 1st example of the present disclosure.
Figure 4C:
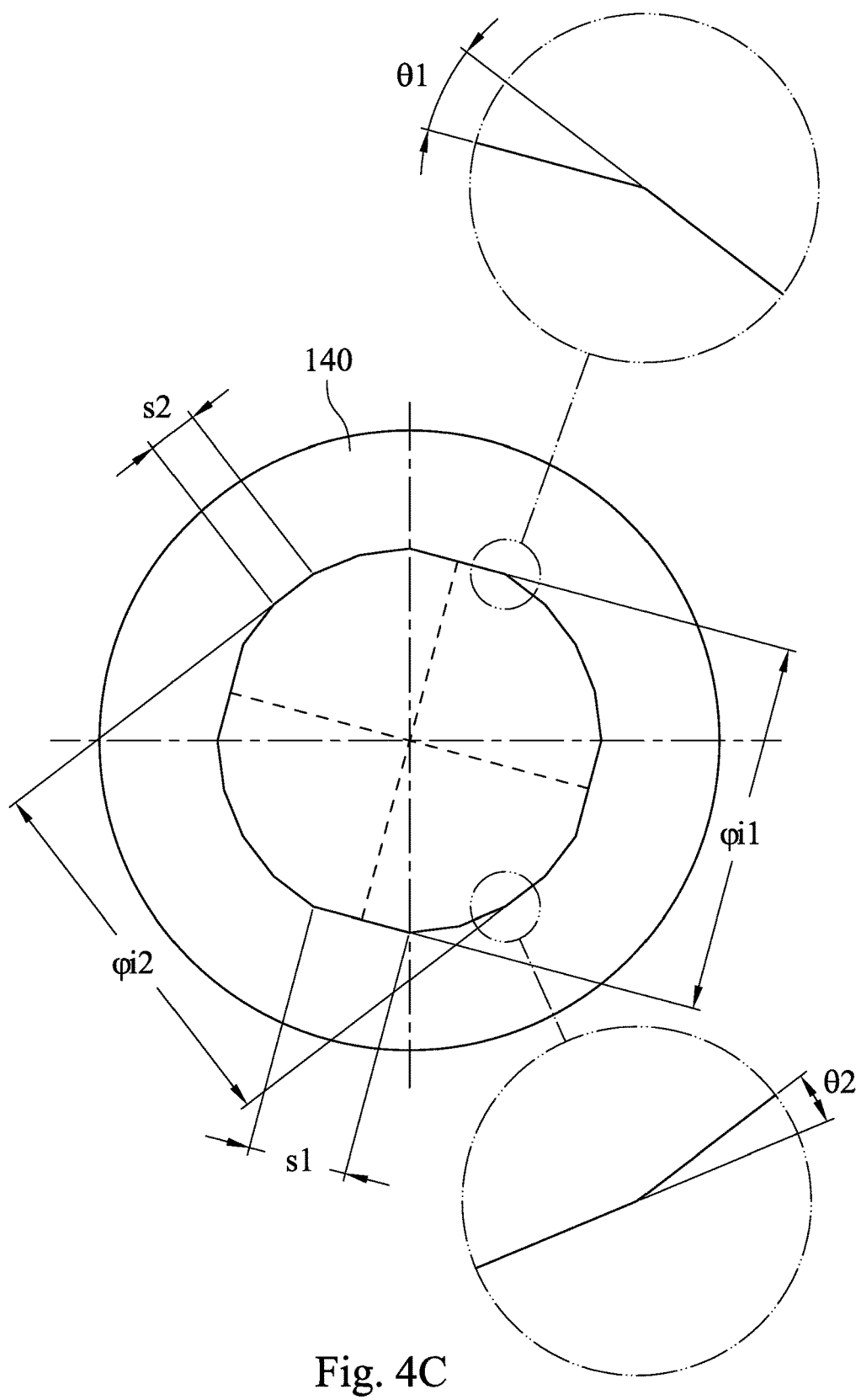
FIG. 4C is a schematic view of a light blocking sheet according to the 1st example of the present disclosure.
Figure 4D:
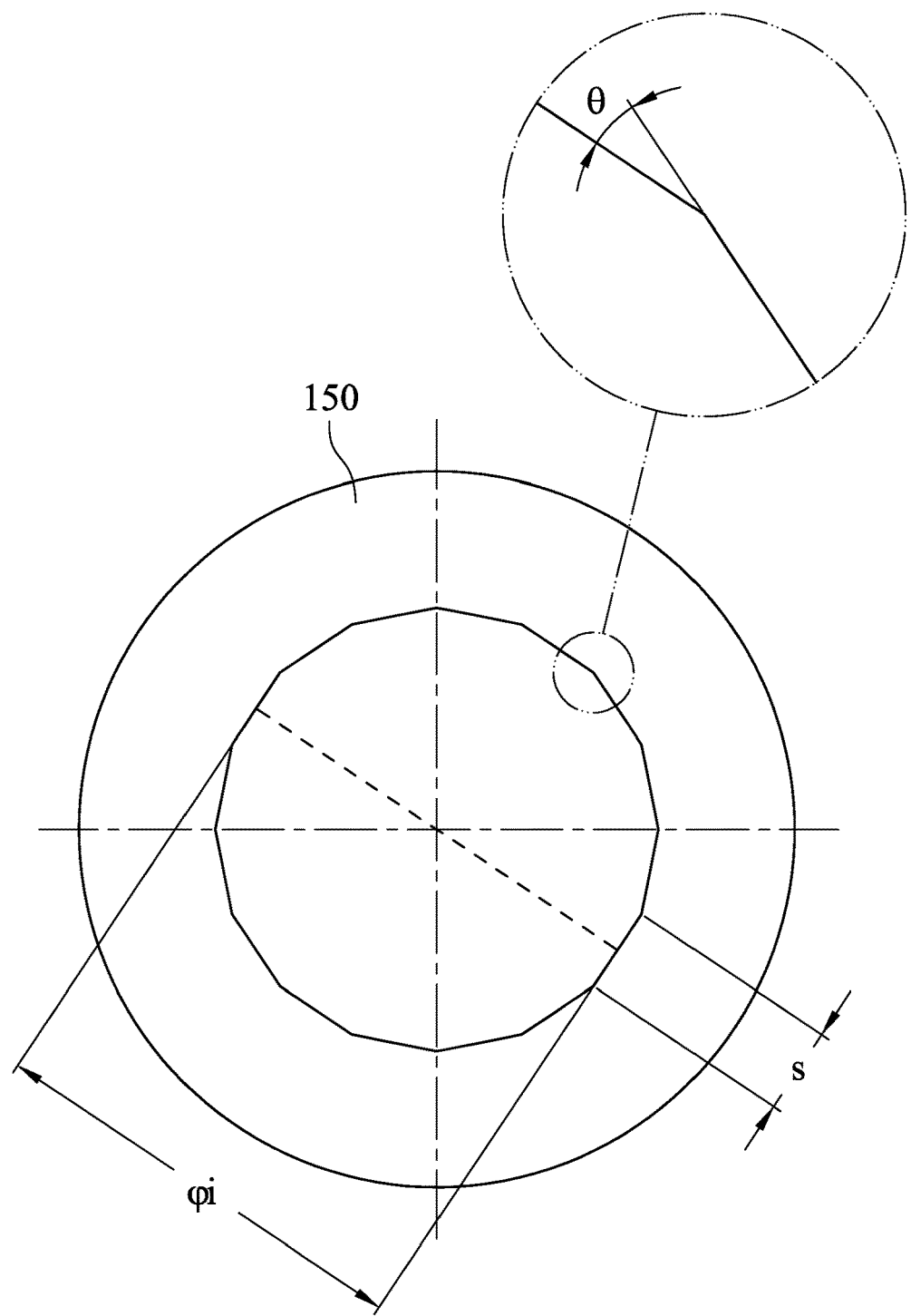
FIG. 4D is a schematic view of another light blocking sheet according to the 1st example of the present disclosure.

Please refer to FIG. 4A, FIG. 4B, FIG. 4C and FIG. 4D. FIG. 4A is a schematic view of an optical lens assembly according to a 1st example of the present disclosure, FIG. 4B is an exploded view of the optical lens assembly according to the 1st example of the present disclosure, FIG. 4C is a schematic view of a light blocking sheet 140 according to the 1st example of the present disclosure, and FIG. 4D is a schematic view of another light blocking sheet 150 according to the 1st example of the present disclosure. In FIG. 4A, the optical lens assembly includes three lens elements and two light blocking sheets, that is, a first lens element 110, the light blocking sheet 140, a second lens element 120, the light blocking sheet 150 and a third lens element 130. The light blocking sheet 140 is received in a receiving space 141 between the first lens element 110 and the second lens element 120. When a width parallel to the optical axis of the receiving space 141 is R1, R1 is 0.038 mm. The light blocking sheet 150 is received in a receiving space 151 between the second lens element 120 and the third lens element 130. When a width parallel to the optical axis of the receiving space 151 is R2, R2 is 0.038 mm.

As shown in FIG. 4A and FIG. 4B, the first lens element 110 and the second lens element 120 include a connecting structure 111 and a connecting structure 121a, respectively, for aligning the two lens elements with each other. The connecting structure 111 of the first lens element 110 includes a connecting surface 112 and a circular conical surface 113. The connecting structure 121a of the second lens element 120 includes a connecting surface 122a and a circular conical surface 123a. The connecting surfaces 112, 122a are correspondingly connected to each other, and the circular conical surfaces 113, 123a are correspondingly connected to each other for forming the receiving space 141. A vertical distance between the receiving space 141 and an optical axis is shorter than a vertical distance between each of the circular conical surfaces 113, 123a and the optical axis. That is, the receiving space 141 is closer to the optical axis than each of the circular conical surfaces 113, 123a is thereto. The receiving space 141 is for receiving the light blocking sheet 140, in which an outside diameter φ1 of the light blocking sheet 140 is smaller than an outside diameter D11 of the first lens element 110 and an outside diameter D12 of the second lens element 120. The outside diameter φ1 of the light blocking sheet 140 is smaller than or equal to a minimum diameter C11 of the circular conical surface 113 of the first lens element 110 and a minimum diameter C12a of the circular conical surface 123 of the second lens element 120. In the 1st example, D11 is 4.4 mm, D12 is 4.3 mm, C11 is 3.55 mm, and C12a is 3.59 mm.

In the 1st example of FIG. 4C, an angle between the circular conical surface 113 of the first lens element 110 and the optical axis is β1, in which the angle between the circular conical surface 113 of the first lens element 110 and the optical axis is equal to an angle between the circular conical surface 123a of the second lens element 120 and the optical axis. The light blocking sheet 140 has a polygonal opening (the reference numerals are omitted). The polygonal opening has twenty inner sides, and lengths of the inner sides are s1 and s2, separately. External angles formed between every two inner sides adjacent to each other, which are less than 90 degrees, are θ1 and θ2, separately. Inner diameters of the polygonal opening of the light blocking sheet 140 are φi1 and φi2, separately, and an outside diameter of the light blocking sheet 140 is φ1. The values of φ1, φi1, φi2, φi1/φ, φi2/φ, β1, s1, s2, θ1, θ2, φi1/(s1/2) and φi2/(s2/2) are listed as follows:

| φ1 | 3.55 mm | s1 | 0.57 mm |
| φi1 | 2.12 mm | s2 | 0.29 mm |
| φi2 | 2.18 mm | θ1 | 22.4 degrees |
| φi1/φ | 0.597 | θ2 | 15 degrees |
| φi2/φ | 0.614 | φi1/(s1/2) | 7.439 |
| β1 | 20 degrees | φi2/(s2/2) | 15.034 |

Furthermore, the second lens element 120 and the third lens element 130 include a connecting structure 121b and a connecting structure 131, respectively, for aligning the two lens elements with each other. The connecting structure 121b of the second lens element 120 includes a connecting surface 122b and a circular conical surface 123b. The connecting structure 131 of the third lens element 130 includes a connecting surface 132 and a circular conical surface 133. The connecting surfaces 122b, 132 are correspondingly connected to each other, and the circular conical surfaces 123b, 133 are correspondingly connected to each other for forming the receiving space 151. A vertical distance between the receiving space 151 and the optical axis is shorter than a vertical distance between each of the circular conical surfaces 123b, 133 and the optical axis. That is, the receiving space 151 is closer to the optical axis than each of the circular conical surfaces 123b, 133 is thereto. The receiving space 151 is for receiving the light blocking sheet 150, in which an outside diameter φ2 of the light blocking sheet 150 is smaller than an outside diameter D12 of the second lens element 120 and an outside diameter D13 of the third lens element 130. The outside diameter φ2 of the light blocking sheet 150 is smaller than or equal to a minimum diameter C12b of the circular conical surface 123b of the second lens element 120 and a minimum diameter C13 of the circular conical surface 133 of the third lens element 130. In the 1st example, D12 is 4.3 mm, D13 is 4.9 mm, C12b is 3.65 mm, and C13 is 3.71 mm.

In the 1st example of FIG. 4D, an angle between the circular conical surface 123b of the second lens element 120 and the optical axis is β2, in which the angle between the circular conical surface 123b of the second lens element 120 and the optical axis is equal to an angle between the circular conical surface 133 of the third lens element 130 and the optical axis. The light blocking sheet 150 has a polygonal opening (the reference numerals are omitted). The polygonal opening has sixteen inner sides, and a length of each inner side is s. An external angle formed between every two inner sides, which is less than 90 degrees, is θ. An inner diameter of the polygonal opening of the light blocking sheet 150 is φi, and an outside diameter of the light blocking sheet 150 is φ2. The values of φ2, φi, φi/φ, β2, s, θ, and φi/(s/2) are listed as follows:

| φ2 | 3.55 mm | s | 0.43 mm |
| φi | 2.16 mm | θ | 22.5 degrees |
| φi/φ | 0.608 | φi/(s/2) | 10.047 |
| β2 | 30 degrees | | |

In the 1st example, both the light blocking sheet 140 and the light blocking sheet 150 are the composite light blocking sheets shown in FIG. 1A. The inside substrate layers of the light blocking sheet 140 and the light blocking sheet 150 are made of plastic materials, and the first surface layers and the second surface layers of the light blocking sheet 140 and the light blocking sheet 150 are made of black carbon-containing materials.

The first lens element 110 further includes a flat surface 114, the second lens element 120 further includes a flat surface 124a and a flat surface 124b, and the third lens element 130 further includes a flat surface 134. The flat surfaces 114, 124a are corresponding to the receiving space 141 and vertical to the optical axis. The flat surfaces 124b, 134 are corresponding to the receiving space 151 and vertical to the optical axis.

2nd Example

Figure 5:
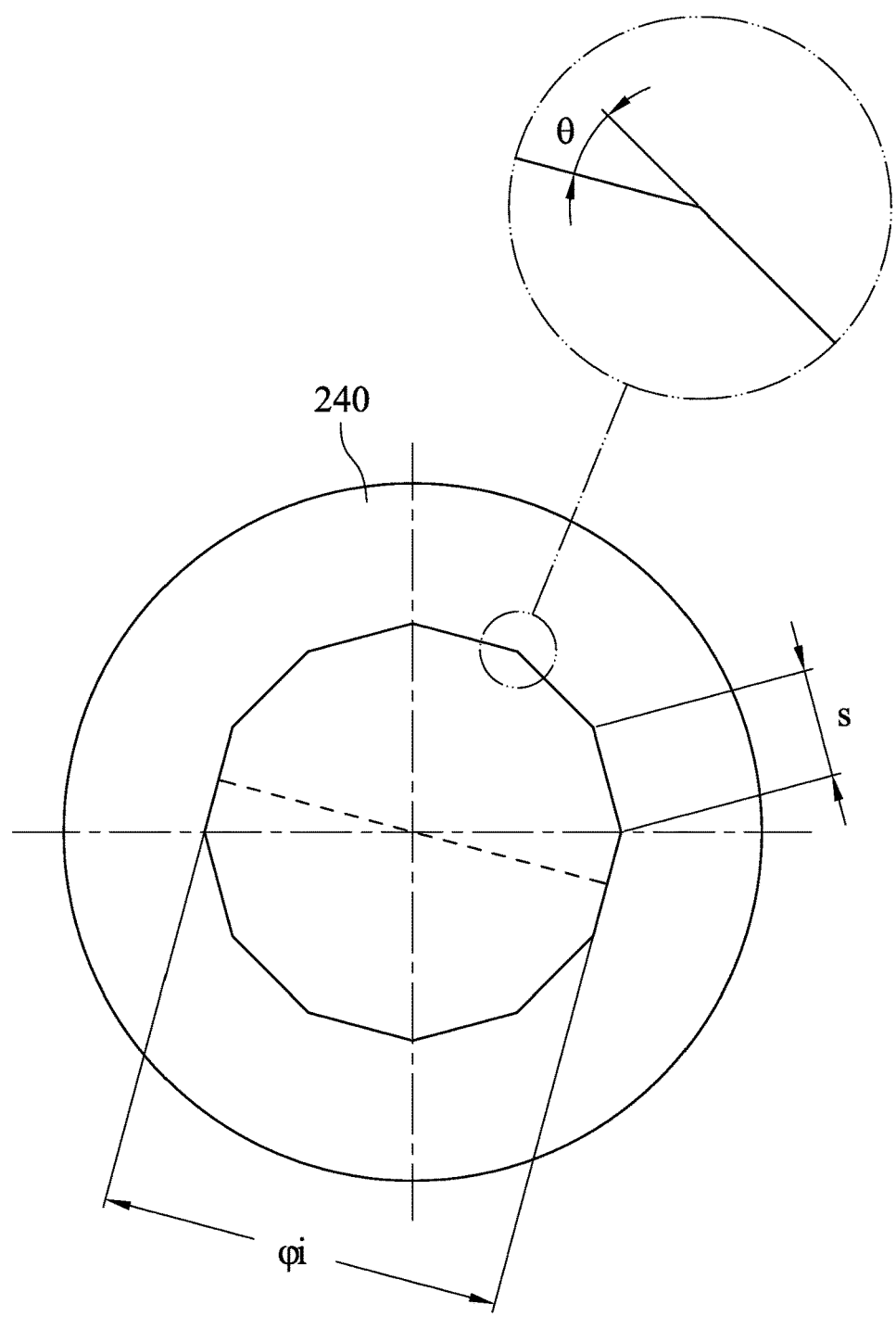
FIG. 5 is a schematic view of a light blocking sheet of an optical lens assembly according to a 2nd example of the present disclosure.

FIG. 5 is a schematic view of a light blocking sheet 240 of an optical lens assembly according to a 2nd example of the present disclosure. The configuration between the optical lens assembly, the lens elements and the light blocking sheet 240 of the 2nd example is the same as the configuration between the first lens element 110, the second lens elements 120 and the light blocking sheet 140 of the 1st example. Thus, there is no further description herein.

In the 2nd example of FIG. 5, the light blocking sheet 240 has a polygonal opening (the reference numerals are omitted). The polygonal opening has twelve inner sides, and a length of each inner side is s. An external angle formed between every two inner sides, which is less than 90 degrees, is θ. An inner diameter of the polygonal opening of the light blocking sheet 240 is φi, and an outside diameter of the light blocking sheet 240 is φ. The values of φ, φi, φi/φ, s, θ, and φi/(s/2) are listed as follows:

| φ | 3.55 mm | s | 0.56 mm |
| φi | 2.11 mm | θ | 30 degrees |
| φi/φ | 0.594 | φi/(s/2) | 7.536 |

In the 2nd example, the light blocking sheet 240 is the composite light blocking sheets shown in FIG. 1A. The inside substrate layer of the light blocking sheet 240 is made of a plastic material, and the first surface layer and the second surface layer of the light blocking sheet 240 are made of black carbon-containing materials.

3rd Example

Figure 6:
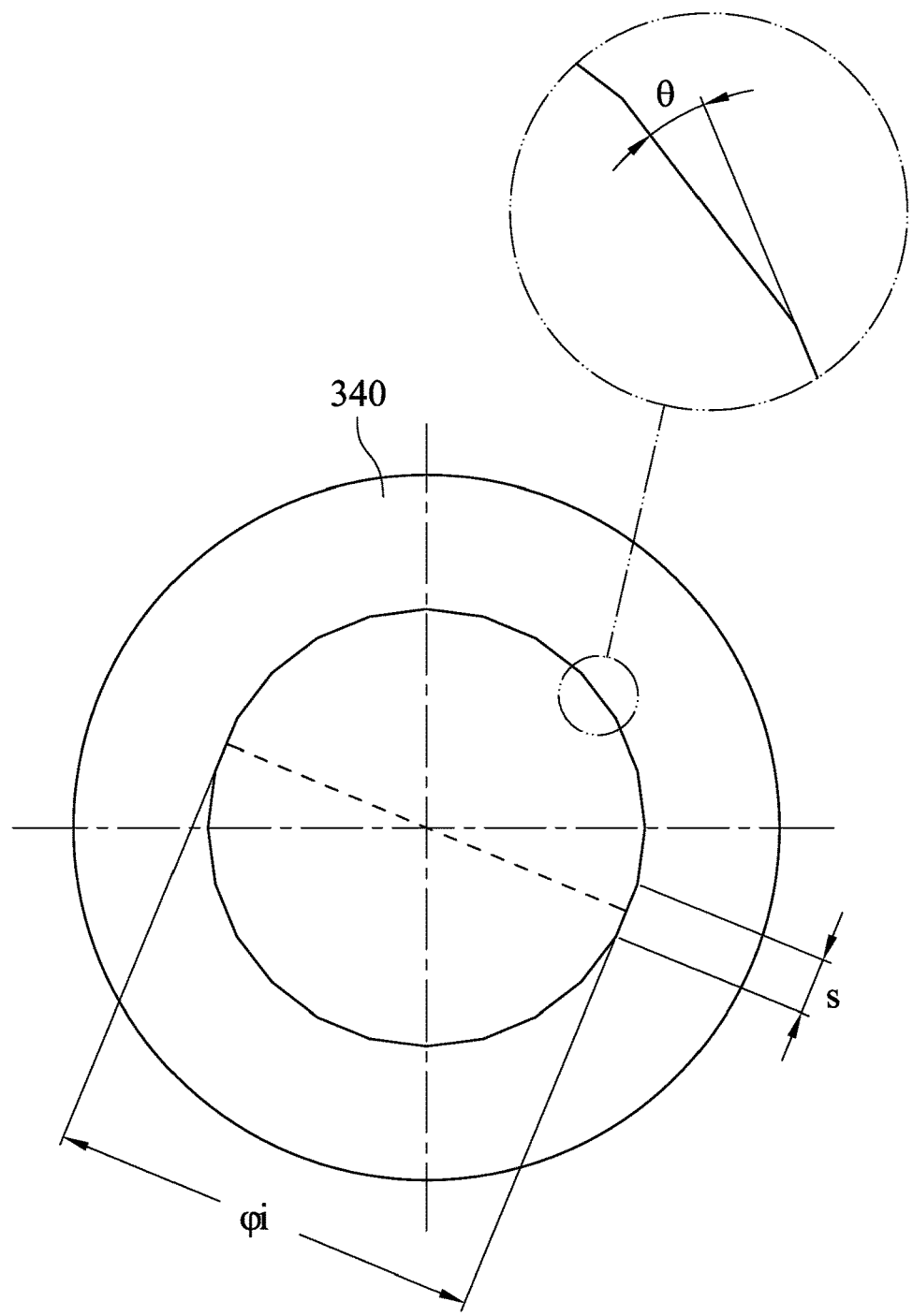
FIG. 6 is a schematic view of a light blocking sheet of an optical lens assembly according to a 3rd example of the present disclosure.

FIG. 6 is a schematic view of a light blocking sheet 340 of an optical lens assembly according to a 3rd example of the present disclosure. The configuration between the optical lens assembly, the lens elements and the light blocking sheet 340 of the 3rd example is the same as the configuration between the first lens element 110, the second lens elements 120 and the light blocking sheet 140 of the 1st example. Thus, there is no further description herein.

In the 3rd example of FIG. 6, the light blocking sheet 340 has a polygonal opening (the reference numerals are omitted). The polygonal opening has twenty-four inner sides, and a length of each inner side is s. An external angle formed between every two inner sides, which is less than 90 degrees, is θ. An inner diameter of the polygonal opening of the light blocking sheet 340 is φi, and an outside diameter of the light blocking sheet 340 is φ. The values of φ, φi, φi/φ, s, θ, and φi/(s/2) are listed as follows:

| φ | 3.55 mm | s | 0.29 mm |
|---|---|---|---|
| φi | 2.18 mm | θ | 15 degrees |
| φi/φ | 0.614 | φi/(s/2) | 15.034 |

In the 3rd example, the light blocking sheet 340 is the composite light blocking sheets shown in FIG. 1A. The inside substrate layer of the light blocking sheet 340 is made of a plastic material, and the first surface layer and the second surface layer of the light blocking sheet 340 are made of black carbon-containing materials.

4th Example

Figure 7:
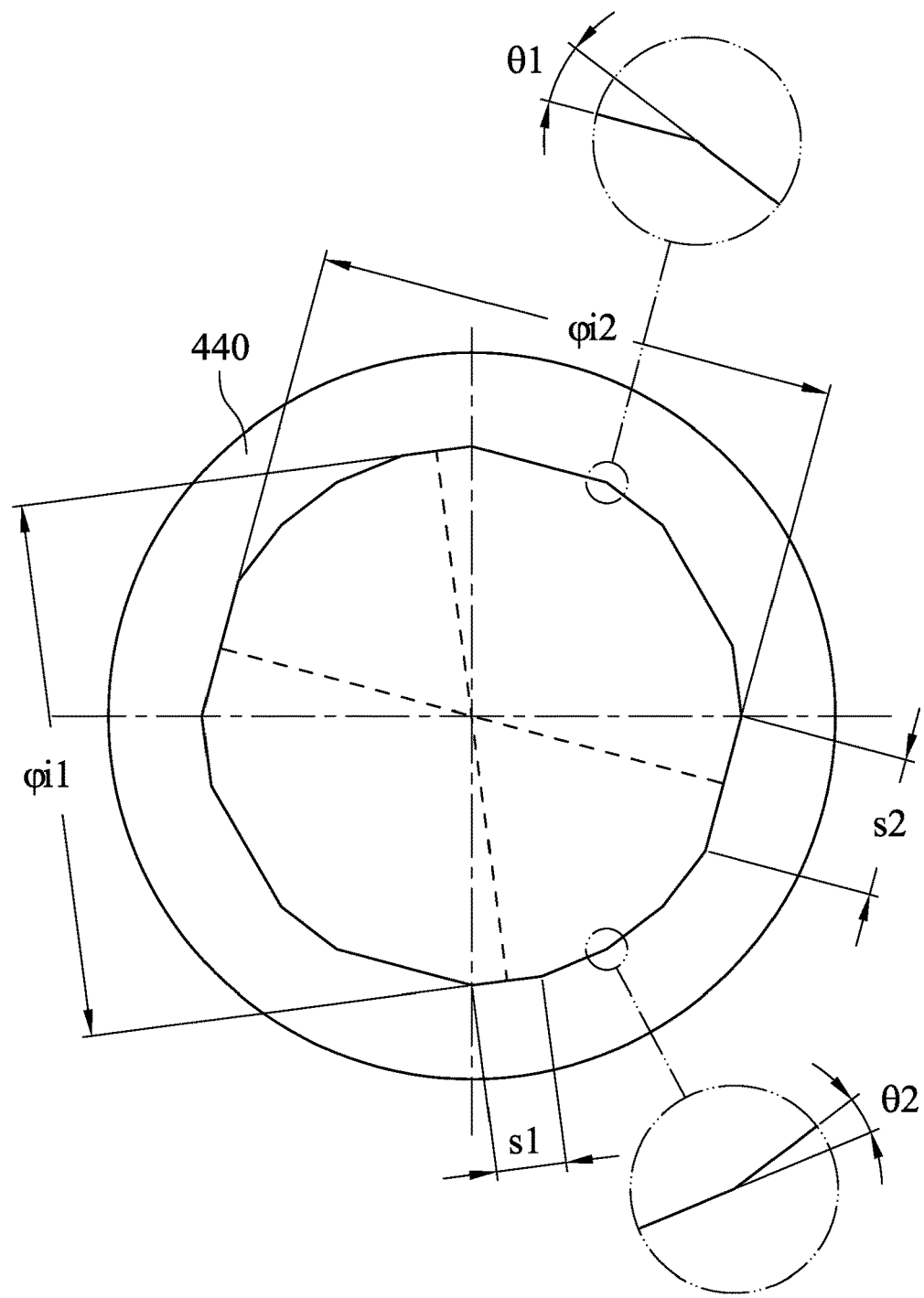
FIG. 7 is a schematic view of a light blocking sheet of an optical lens assembly according to a 4th example of the present disclosure.

FIG. 7 is a schematic view of a light blocking sheet 440 of an optical lens assembly according to a 4th example of the present disclosure. The configuration between the optical lens assembly, the lens elements and the light blocking sheet 440 of the 4th example is the same as the configuration between the first lens element 110, the second lens elements 120 and the light blocking sheet 140 of the 1st example. Thus, there is no further description herein.

In the 4th example of FIG. 7, the light blocking sheet 440 has a polygonal opening (the reference numerals are omitted). The polygonal opening has eighteen inner sides, and lengths of the inner sides are s1 and s2, separately. External angles formed between every two inner sides, which are less than 90 degrees, are θ1 and θ2, separately. Inner diameters of the polygonal opening of the light blocking sheet 440 are φi1 and φi2, separately, and an outside diameter of the light blocking sheet 440 is φ. The values of φ, φi1, φi2, φi1/φ, φi2/φ, s1, s2, θ1, θ2, φi1/(s1/2) and φi2/(s2/2) are listed as follows:

| φ | 7.0 mm | s2 | 1.35 mm |
|---|---|---|---|
| φi1 | 5.15 mm | θ1 | 22.4 degrees |
| φi2 | 5.02 mm | θ2 | 14.7 degrees |
| φi1/φ | 0.736 | φi1/(s1/2) | 15.147 |
| φi2/φ | 0.717 | φi2/(s2/2) | 7.437 |
| s1 | 0.68 mm | | |

In the 4th example, the light blocking sheet 440 is the composite light blocking sheets shown in FIG. 1A. The inside substrate layer of the light blocking sheet 440 is made of a plastic material, and the first surface layer and the second surface layer of the light blocking sheet 440 are made of black carbon-containing materials.

5th Example

Figure 8:
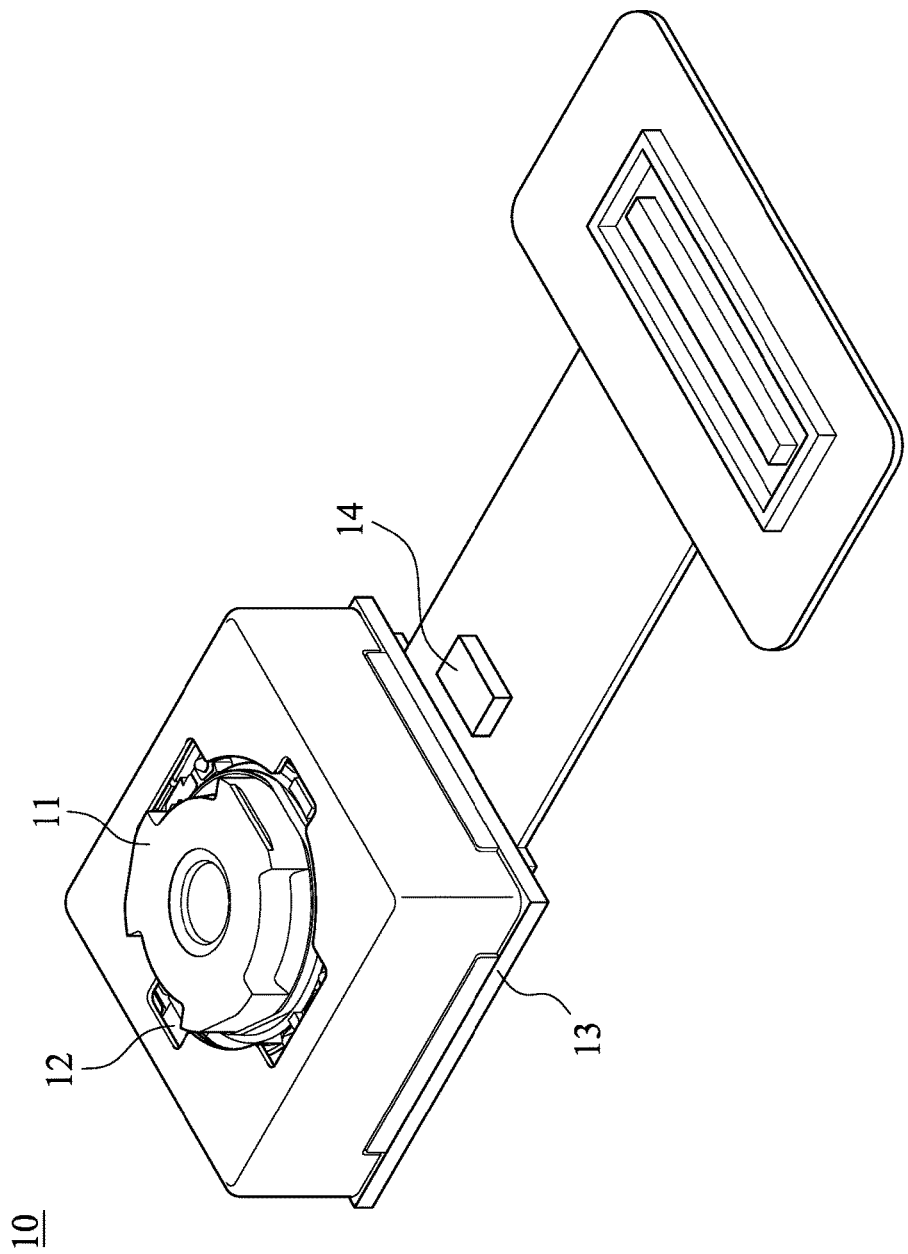
FIG. 8 is a schematic view of an image capturing device according to a 5th example of the present disclosure.

FIG. 8 is a schematic view of an image capturing device 10 according to a 5th example of the present disclosure. As shown in FIG. 8, the image capturing device 10 of the 5th example is a camera module. The image capturing device 10 includes an imaging lens module 11, a driving assembly 12 and an image sensor 13, in which the imaging lens module 11 includes the optical lens assembly of the 1st example and a barrel (the reference numerals are omitted) for carrying the optical lens assembly. In the image capturing device 10, lights are focused by the imaging lens module 11 for generating an image, the driving assembly 12 is used to assist the imaging lens module 11 into focus, then the image is formed on the image sensor 13, and the data of the image is outputted.

The driving assembly 12 can be an auto-focus module, and a driving method thereof can use a voice coil motor (VCM), a micro electro-mechanical system (MEMS), a piezoelectric system or a shape memory alloy system. The driving assembly 12 enables the imaging lens module 11 to obtain a preferable imaging position, so that the imaged object in different object distances can be imaged clearly.

The image sensor 13 of the image capturing device 10 disposed on the image surface of the imaging lens module 11 can have the properties of high light sensitivity and low noise (such as CMOS and CCD), so that the excellent image quality of the imaging lens module 11 can be truly presented.

Moreover, the image capturing device 10 further includes an image stabilization module 14, such as an accelerator, a gyroscope or a Hall effect sensor. In the 5th example, the image stabilization module 14 is but not limited to the gyroscope. By adjusting the changes in different axial directions of the optical lens set, the blurry image resulting in the shaking of the shooting moment can be compensated, so that the image quality of dynamic scenes or low-light scenes can be enhanced. Furthermore, advanced image-compensating functions, such as an optical image stabilization (OIS) or an electronic image stabilization (EIS) can be provided.

6th Example

Figure 9A:
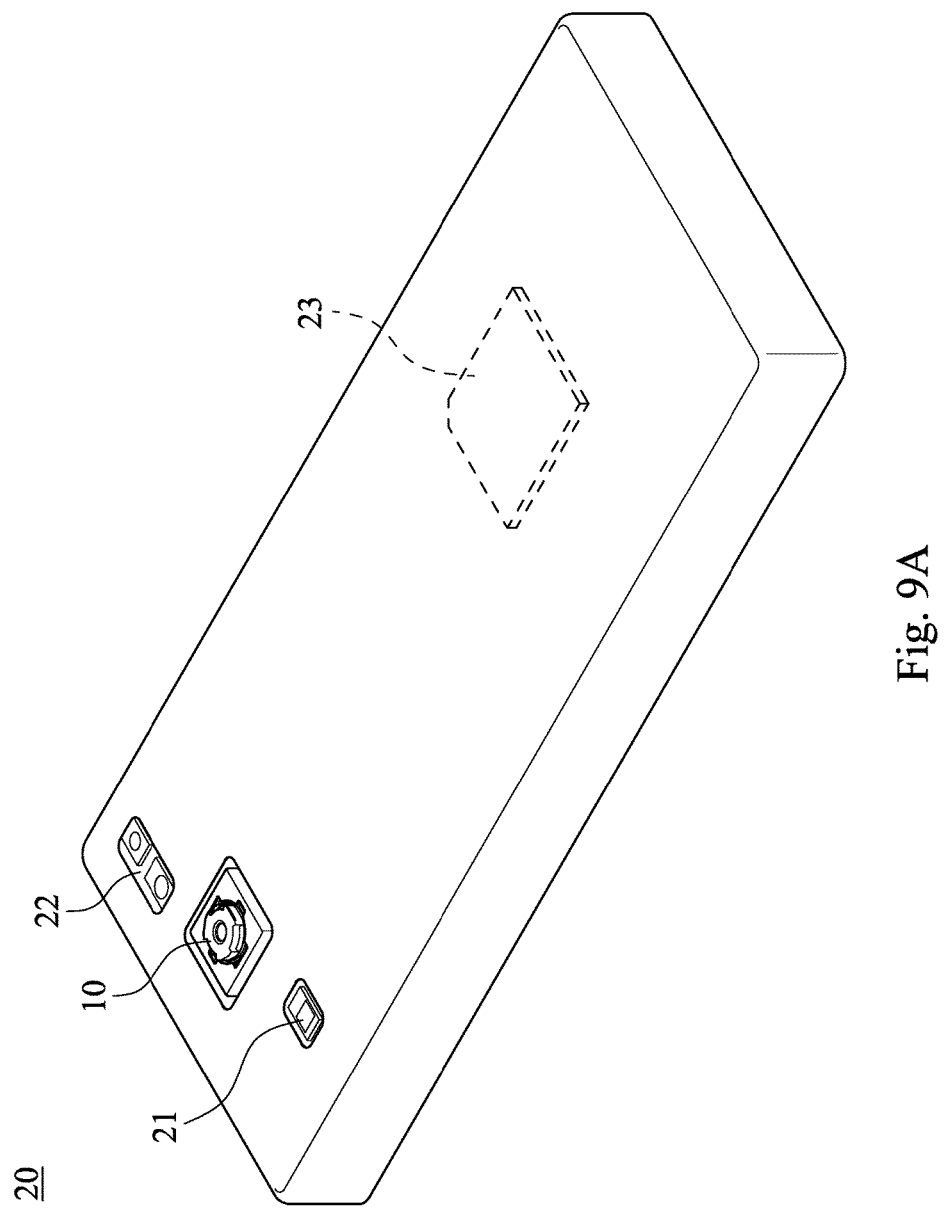
FIG. 9A is a schematic view of an electronic apparatus according to a 6th embodiment of the present disclosure.
Figure 9B:
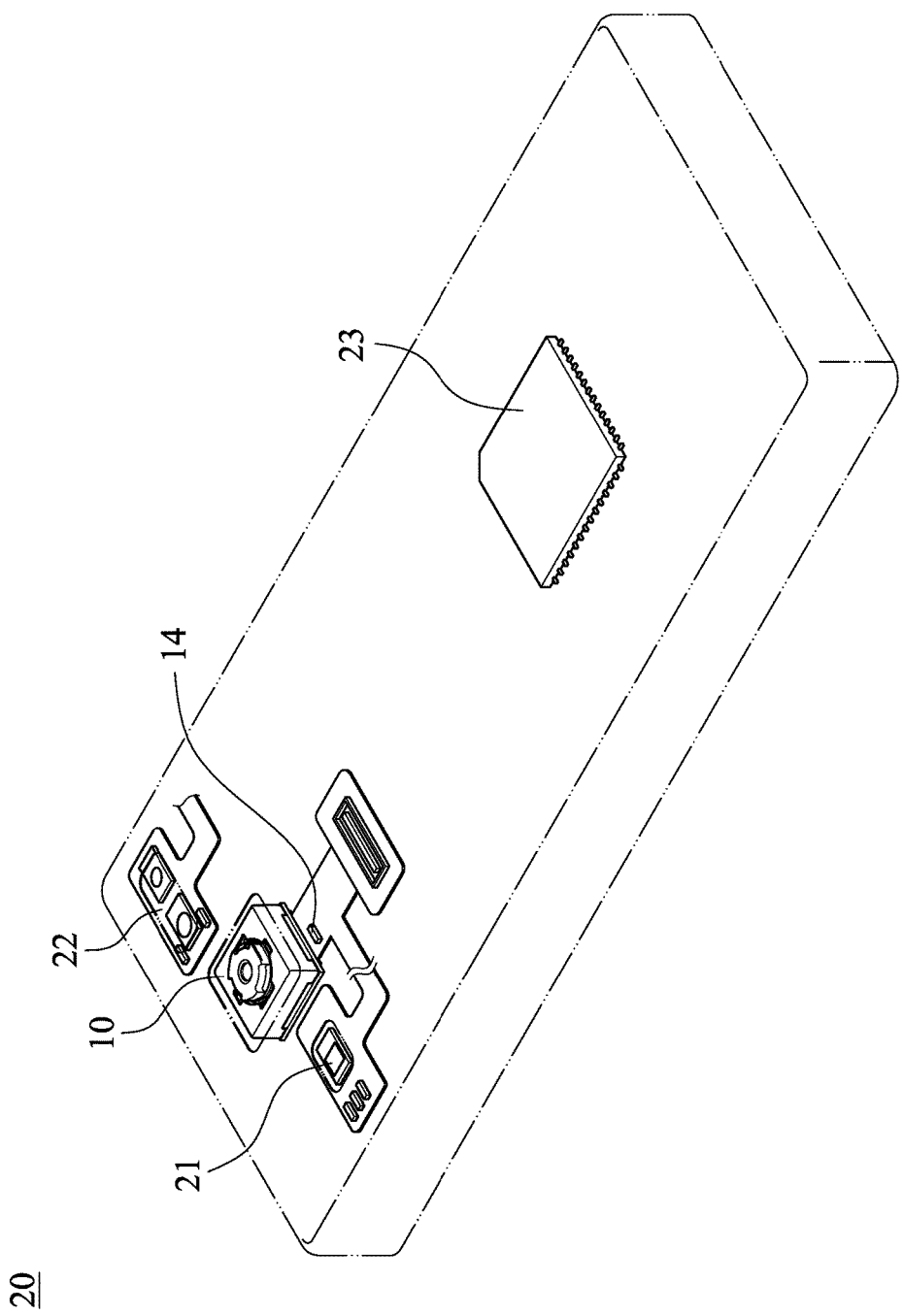
FIG. 9B is a perspective schematic view of the electronic apparatus in FIG. 9A.
Figure 9C:
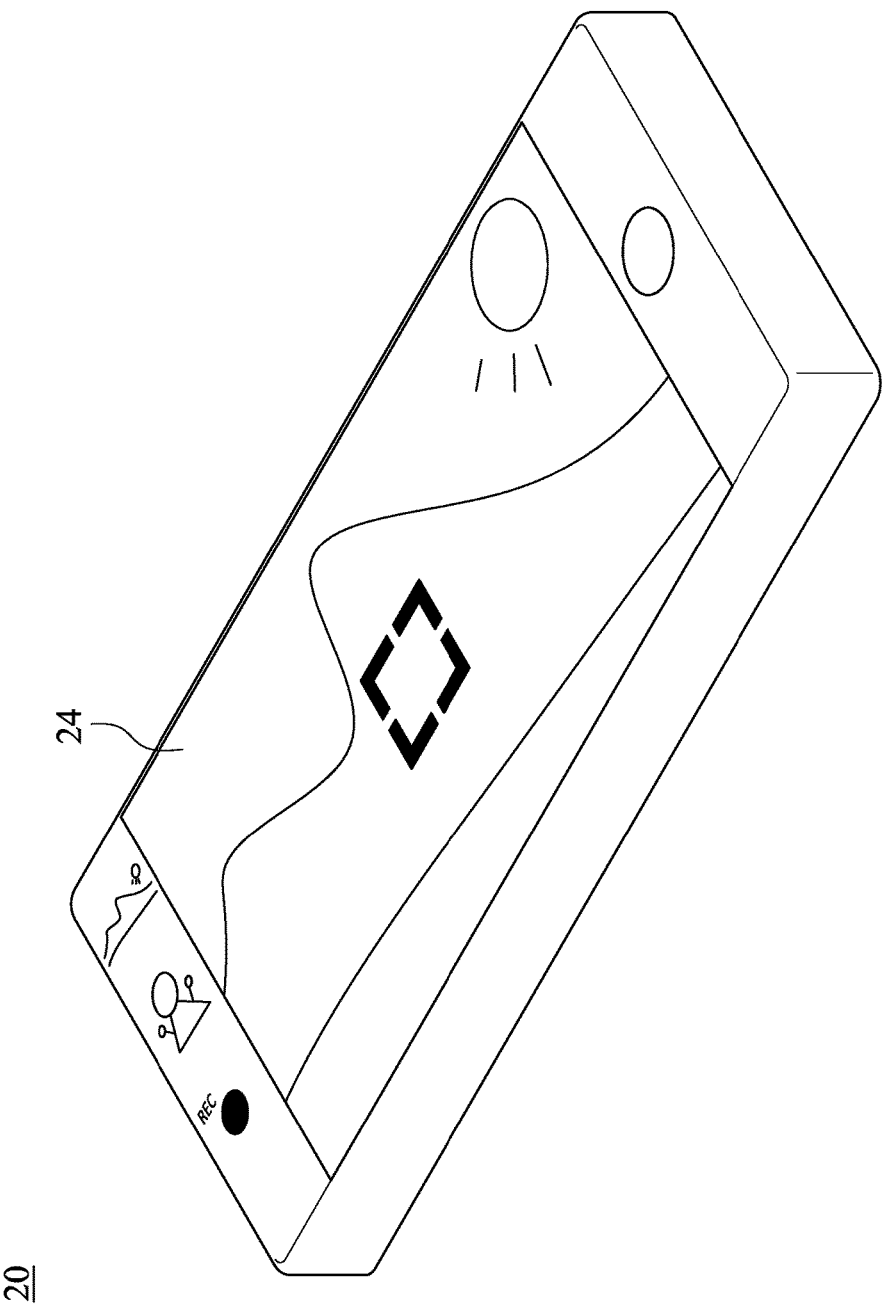
FIG. 9C is a schematic view of the electronic apparatus in FIG. 9A from another view angle.
Figure 9D:
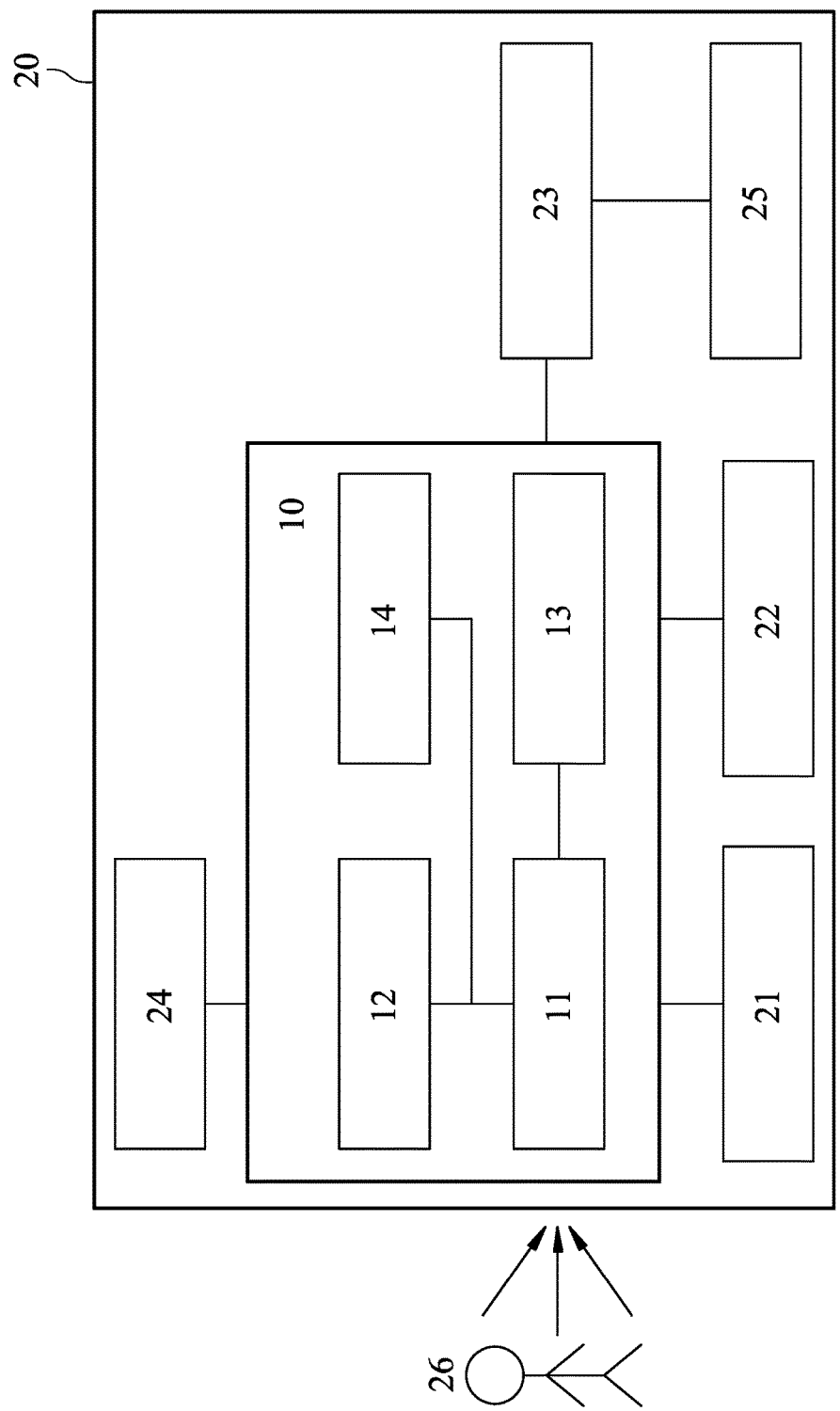
FIG. 9D is a block diagram of the electronic apparatus in FIG. 9A.

Please refer to FIG. 9A, FIG. 9B, FIG. 9C and FIG. 9D. FIG. 9A is a schematic view of an electronic apparatus 20 according to a 6th embodiment of the present disclosure, FIG. 9B is a perspective schematic view of the electronic apparatus 20 in FIG. 9A, FIG. 9C is a schematic view of the electronic apparatus 20 in FIG. 9A from another view angle, and FIG. 9D is a block diagram of the electronic apparatus 20 in FIG. 9A. In FIG. 9A, FIG. 9B, FIG. 9C and FIG. 9D, the electronic device 20 of the 6th example is a smart phone. The electronic device 20 includes the image capturing device 10, a flash module 21, an auxiliary focusing module 22, an image signal processor 23, a user interface 24 and an image processing software 25. When a user shoots an imaged object 26 with the electronic device 20 via the user interface 24, lights are focused by the image capturing device 10 for generating an image, a light compensation function is provided by the flash module 21, the object distance of the imaged object 26 is provided by the auxiliary focusing module 22 for focusing quickly, and an optimizing image processing is provided by the image signal processor 23 and the image processing software 25, so that the image quality can be further enhanced. The auxiliary focusing module 22 can adopt an infrared auxiliary focusing system or a laser auxiliary focusing system for focusing quickly. The user interface 24 can adopt a touch screen or a physical shooting button, and the image processing software 25 can be coordinated with the user interface 24 for providing a variety of shooting modes and a variety of image processings.

The image capturing device 10 of the 6th example is the same as the image capturing device 10 of the 5th example, and there is no further description herein.

7th Example

Figure 10:
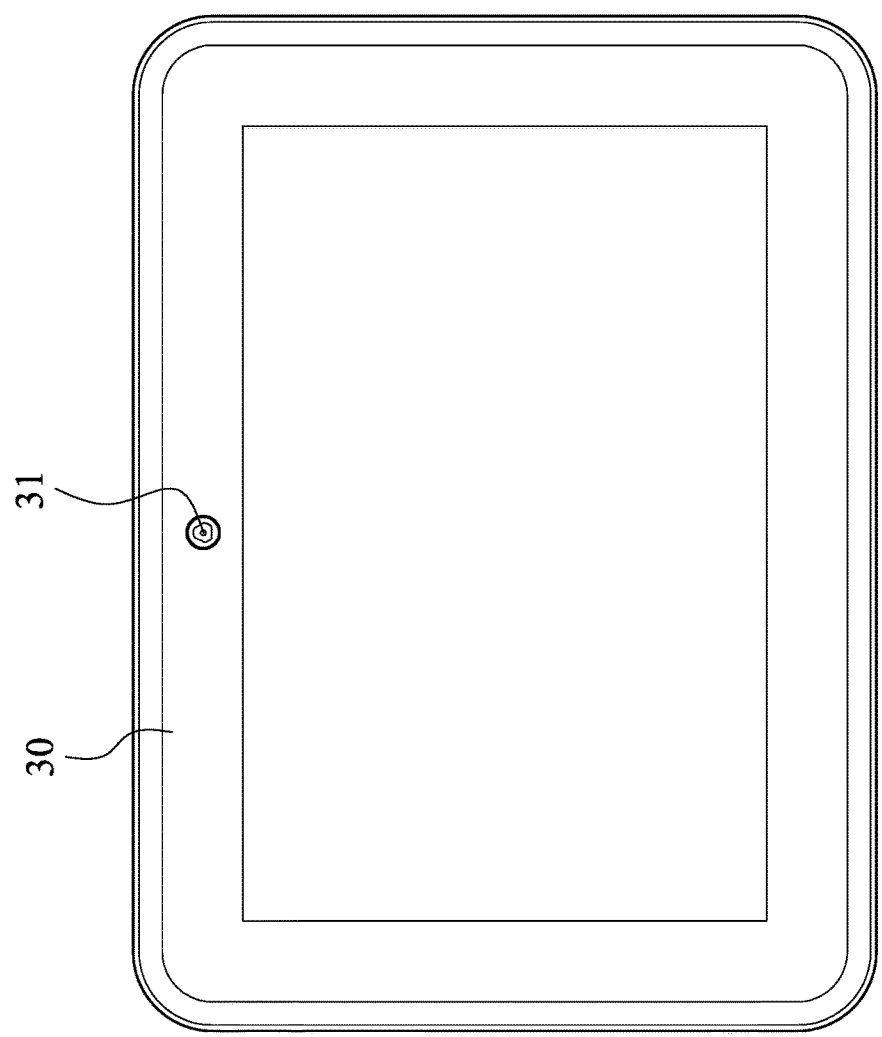
FIG. 10 is a schematic view of an electronic apparatus according to a 7th example of the present disclosure.

FIG. 10 is a schematic view of an electronic apparatus 30 according to a 7th example of the present disclosure. In FIG. 10, the electronic device 30 of the 7th example is a tablet personal computer. The electronic device 30 includes an image capturing device 31. The image capturing device 31 can be the same as that of the 5th example, and will not be repeated herein.

8th Example

Figure 11:
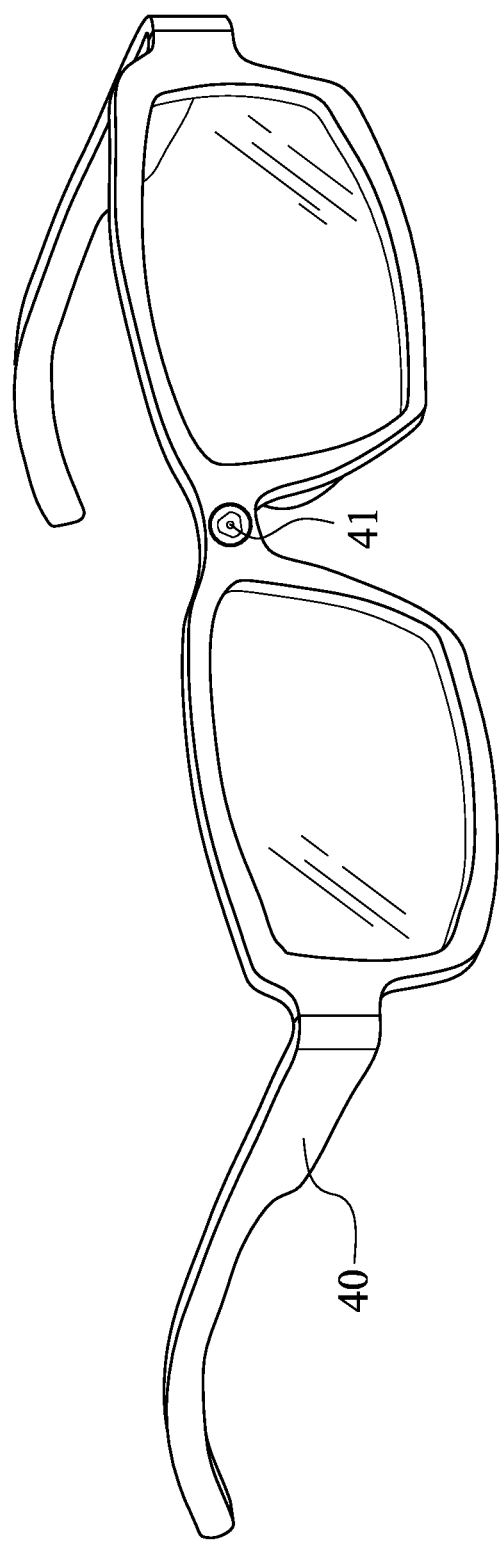
FIG. 11 is a schematic view of an electronic apparatus according to an 8th example of the present disclosure.

FIG. 11 is a schematic view of an electronic apparatus 40 according to an 8th example of the present disclosure. In FIG. 11, the electronic device 40 of the 8th embodiment is a wearable device. The electronic device 40 includes an image capturing device 41. The image capturing device 41 can be the same as that of the 5th example, and will not be repeated herein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical lens assembly, comprising:
at least two lens elements, wherein each of the lens elements comprises a connecting structure for aligning the two lens elements, and each of the connecting structures comprises:
a connecting surface; and
a circular conical surface;
wherein the connecting surfaces of the two lens elements are connected to each other, the circular conical surfaces of the two lens elements are connected to each other for forming a receiving space between the two lens elements, and a vertical distance between the receiving space and an optical axis is shorter than a vertical distance between each of the circular conical surfaces and the optical axis; and
a first light blocking sheet and a second light blocking sheet, the first light blocking sheet received in the receiving space, and the second light blocking sheet having a polygonal opening, wherein an outside diameter of the first light blocking sheet is smaller than an outside diameter of each lens element, and the outside diameter of the first light blocking sheet is smaller than or equal to a minimum diameter of the circular conical surface of each lens element;
wherein the polygonal opening of the second light blocking sheet has a plurality of inner sides, an inner diameter of the polygonal opening of the second light blocking sheet is φi, a length of each inner side is s, and the following condition is satisfied:

$$7.1 < \varphi i/(s/2) < 30.$$

2. The optical lens assembly of claim 1, wherein the second light blocking sheet is a composite light blocking sheet and comprises:
a first surface layer having a first opening;
a second surface layer having a second opening; and
an inside substrate layer having a substrate opening and disposed between the first surface layer and the second surface layer to connect the first surface layer and the second surface layer;
wherein the first opening, the second opening and the substrate opening are correspondingly disposed along the optical axis to form the polygonal opening.

3. The optical lens assembly of claim 2, wherein the inside substrate layer is made of a plastic material, and the first surface layer and the second surface layer are made of black carbon-containing materials.

4. The optical lens assembly of claim 2, wherein an angle between each of the circular conical surfaces and the optical axis is β, and the following condition is satisfied:

$$0 \text{ degrees} < \beta < 40 \text{ degrees}.$$

5. The optical lens assembly of claim 2, wherein each of the lens elements further comprises:
a flat surface corresponding to the receiving space and vertical to the optical axis.

6. The optical lens assembly of claim 1, wherein at least one of the two lens elements is aligned to the first light blocking sheet via the circular conical surface thereof.

7. The optical lens assembly of claim 1, wherein the inner diameter of the polygonal opening of the second light blocking sheet is φi, an outside diameter of the second light blocking sheet is φ, and the following condition is satisfied:

$$0.47 < \varphi i/\varphi < 0.90.$$

8. The optical lens assembly of claim 7, wherein the inner diameter of the polygonal opening of the second light blocking sheet is φi, the outside diameter of the second light blocking sheet is φ, and the following condition is satisfied:

$$0.55 < \varphi i/\varphi < 0.90.$$

9. An imaging lens module, comprising:
a barrel; and
the optical lens assembly of claim 1 disposed in the barrel;
wherein the polygonal opening of the second light blocking sheet of the optical lens assembly is corresponding to a minimum central opening of the barrel, and the minimum central opening is an aperture stop of the imaging lens module.

10. An electronic apparatus, comprising:
the imaging lens module of claim 9; and
an image sensor, wherein the image sensor is disposed on an image surface of the imaging lens module.

11. An optical lens assembly, comprising:
at least two lens elements, wherein each of the lens elements comprises a connecting structure for aligning the two lens elements, and each of the connecting structures comprises:
a connecting surface; and
a circular conical surface;

wherein the connecting surfaces of the two lens elements are connected to each other, the circular conical surfaces of the two lens elements are connected to each other for forming a receiving space between the two lens elements, and a vertical distance between the receiving space and an optical axis is shorter than a vertical distance between each of the circular conical surfaces and the optical axis; and a first light blocking sheet and a second light blocking sheet, the first light blocking sheet received in the receiving space, and the second light blocking sheet having a polygonal opening, wherein an outside diameter of the first light blocking sheet is smaller than an outside diameter of each lens element, and the outside diameter of the first light blocking sheet is smaller than or equal to a minimum diameter of the circular conical surface of each lens element;

wherein the polygonal opening of the second light blocking sheet has a plurality of inner sides, an external angle formed between every two inner sides adjacent to each other, which is less than 90 degrees, is θ, and the following condition is satisfied:

9.0 degrees<θ<33.0 degrees.

12. The optical lens assembly of claim 11, wherein the second light blocking sheet is a composite light blocking sheet and comprises:
a first surface layer having a first opening;
a second surface layer having a second opening; and
an inside substrate layer having a substrate opening and disposed between the first surface layer and the second surface layer to connect the first surface layer and the second surface layer;
wherein the first opening, the second opening and the substrate opening are correspondingly disposed along the optical axis to form the polygonal opening.

13. The optical lens assembly of claim 12, wherein the inside substrate layer is made of a plastic material, and the first surface layer and the second surface layer are made of black carbon-containing materials.

14. The optical lens assembly of claim 12, wherein an inner diameter of the polygonal opening of the second light blocking sheets is φi, an outside diameter of the second light blocking sheets is φ, and the following condition is satisfied:

0.47<φi/φ<0.90.

15. An imaging lens module, comprising:
a barrel; and
the optical lens assembly of claim 12 disposed in the barrel;
wherein the polygonal opening of the second light blocking sheets of the optical lens assembly is corresponding to a minimum central opening of the barrel, and the minimum central opening is an aperture stop of the imaging lens module.

16. An electronic apparatus, comprising:
the imaging lens module of claim 15; and
an image sensor, wherein the image sensor is disposed on an image surface of the imaging lens module.

* * * * *